United States Patent
Wu et al.

(10) Patent No.: US 12,413,685 B2
(45) Date of Patent: Sep. 9, 2025

(54) SYSTEM, METHOD AND COMPUTER-READABLE MEDIUM FOR VIDEO PROCESSING

(71) Applicant: 17LIVE Japan Inc., Tokyo (JP)

(72) Inventors: Shao-Yuan Wu, Taipei (TW); Ming-Che Cheng, Taipei (TW); Po-Sheng Chiu, Taipei (TW); Yu-Chuan Chang, Taipei (TW)

(73) Assignee: 17LIVE Japan Inc., Tokyo (JP)

( * ) Notice: Subject to any disclaimer, the term of this patent is extended or adjusted under 35 U.S.C. 154(b) by 91 days.

(21) Appl. No.: 17/881,743

(22) Filed: Aug. 5, 2022

(65) Prior Publication Data

US 2023/0101606 A1    Mar. 30, 2023

Related U.S. Application Data

(63) Continuation-in-part of application No. PCT/US2021/073183, filed on Dec. 30, 2021, and a continuation-in-part of application No. PCT/US2021/073182, filed on Dec. 30, 2021, and a continuation-in-part of application No. PCT/US2021/052779, filed on Sep. 30, 2021.

(51) Int. Cl.
*H04N 7/15* (2006.01)
*G06V 40/20* (2022.01)
*H04N 21/431* (2011.01)
*H04N 21/4728* (2011.01)

(52) U.S. Cl.
CPC ............. *H04N 7/152* (2013.01); *G06V 40/28* (2022.01); *H04N 21/4312* (2013.01); *H04N 21/4728* (2013.01)

(58) Field of Classification Search
None
See application file for complete search history.

(56) References Cited

U.S. PATENT DOCUMENTS

2009/0033737 A1    2/2009    Goose et al.
2013/0250118 A1    9/2013    Kawakami
(Continued)

FOREIGN PATENT DOCUMENTS

CN    104914990 A    9/2015
CN    111294622 A    6/2020
(Continued)

OTHER PUBLICATIONS

Notice of Reasons for Refusal dated Sep. 26, 2023, issued in corresponding Japanese Patent Application No. 2022-522347 with English translation (10 pgs.).
Office Action dated Sep. 2, 2022, issued in corresponding Taiwanese Patent Application No. 110149532 with full English translation (27 pgs.).
Office Action dated Nov. 30, 2022, issued in corresponding Taiwanese Patent Application No. 110149533 with full English translation (19 pgs.).
(Continued)

*Primary Examiner* — Duc Nguyen
*Assistant Examiner* — Assad Mohammed
(74) *Attorney, Agent, or Firm* — Chun-Ming Shih; HDLS IPR SERVICES

(57) ABSTRACT

The present disclosure relates to a system, a method and a computer-readable medium for video processing. The method includes displaying a live video of a first user in a first region on a user terminal and displaying a video of a second user in a second region on the user terminal. A portion of the live video of the first user extends to the second region on the user terminal. The present disclosure can improve interaction during a conference call or a group call.

11 Claims, 28 Drawing Sheets

(56) References Cited

U.S. PATENT DOCUMENTS

| | | |
|---|---|---|
| 2015/0261409 A1 | 9/2015 | Tanaka |
| 2016/0205341 A1 | 7/2016 | Hollander et al. |
| 2017/0127023 A1* | 5/2017 | High .................... G06T 7/30 |
| 2017/0339372 A1 | 11/2017 | Valli |
| 2017/0365036 A1* | 12/2017 | Wang .................... G06T 3/40 |
| 2018/0124477 A1 | 5/2018 | Qu et al. |
| 2019/0222803 A1 | 7/2019 | Pather et al. |
| 2019/0268567 A1* | 8/2019 | Ahn .................... G06F 3/04842 |
| 2020/0099889 A1 | 3/2020 | Sugihara |
| 2020/0177823 A1 | 6/2020 | Zhu et al. |
| 2020/0192550 A1* | 6/2020 | Laaksonen .......... G06F 3/04815 |
| 2021/0099505 A1 | 4/2021 | Ravine |
| 2021/0127071 A1 | 4/2021 | Rebien et al. |
| 2021/0365707 A1 | 11/2021 | Mao et al. |
| 2021/0400142 A1* | 12/2021 | Jorasch .............. H04L 65/1069 |
| 2022/0239812 A1* | 7/2022 | Tokuchi ............... G06V 10/993 |

FOREIGN PATENT DOCUMENTS

| | | |
|---|---|---|
| CN | 111385663 A | 7/2020 |
| CN | 112261424 A | 1/2021 |
| CN | 113038149 A | 6/2021 |
| CN | 113709545 A | 11/2021 |
| JP | 2009-218792 A | 9/2009 |
| JP | 2013-192804 A | 9/2013 |
| JP | 2015-172886 A | 10/2015 |
| JP | 2020-044132 A | 3/2020 |
| JP | 2021-087150 A | 6/2021 |
| TW | 202123172 A | 6/2021 |

OTHER PUBLICATIONS

"Heart Photo Maker Uses Photos to Spell out Hearts, Stars, and Various Hand-Drawn Shapes" with machine translation (26 pgs.). URL: https://briian.com/23999/.

International Search Report dated Dec. 29, 2021, issued in corresponding International Application No. PCT/US2021/052779 (7 pgs.).

International Search Report dated Mar. 17, 2022, issued in corresponding International Application No. PCT/US2021/073182 (7 pgs.).

International Search Report dated Mar. 17, 2022, issued in corresponding International Application No. PCT/US2021/073183 (7 pgs.).

Office Action dated Mar. 13, 2023, issued in corresponding Taiwanese Patent Application No. 110149532 with English translation (16 pgs.).

Rejection Decision dated Jun. 29, 2023, issued in corresponding Taiwanese Patent Application No. 110149533 with English translation (6 pgs.).

Office Action dated Nov. 10, 2023, issued in corresponding Taiwanese Patent Application No. 110149532 with English translation (10 pgs.).

Notice of Reasons for Refusal dated Dec. 19, 2023, issued in corresponding Japanese Patent Application No. 2022-522349 with English translation (14 pgs.).

Notice of Reasons for Refusal dated Dec. 19, 2023, issued in corresponding Japanese Patent Application No. 2022-528663 with English translation (4 pgs.).

* cited by examiner

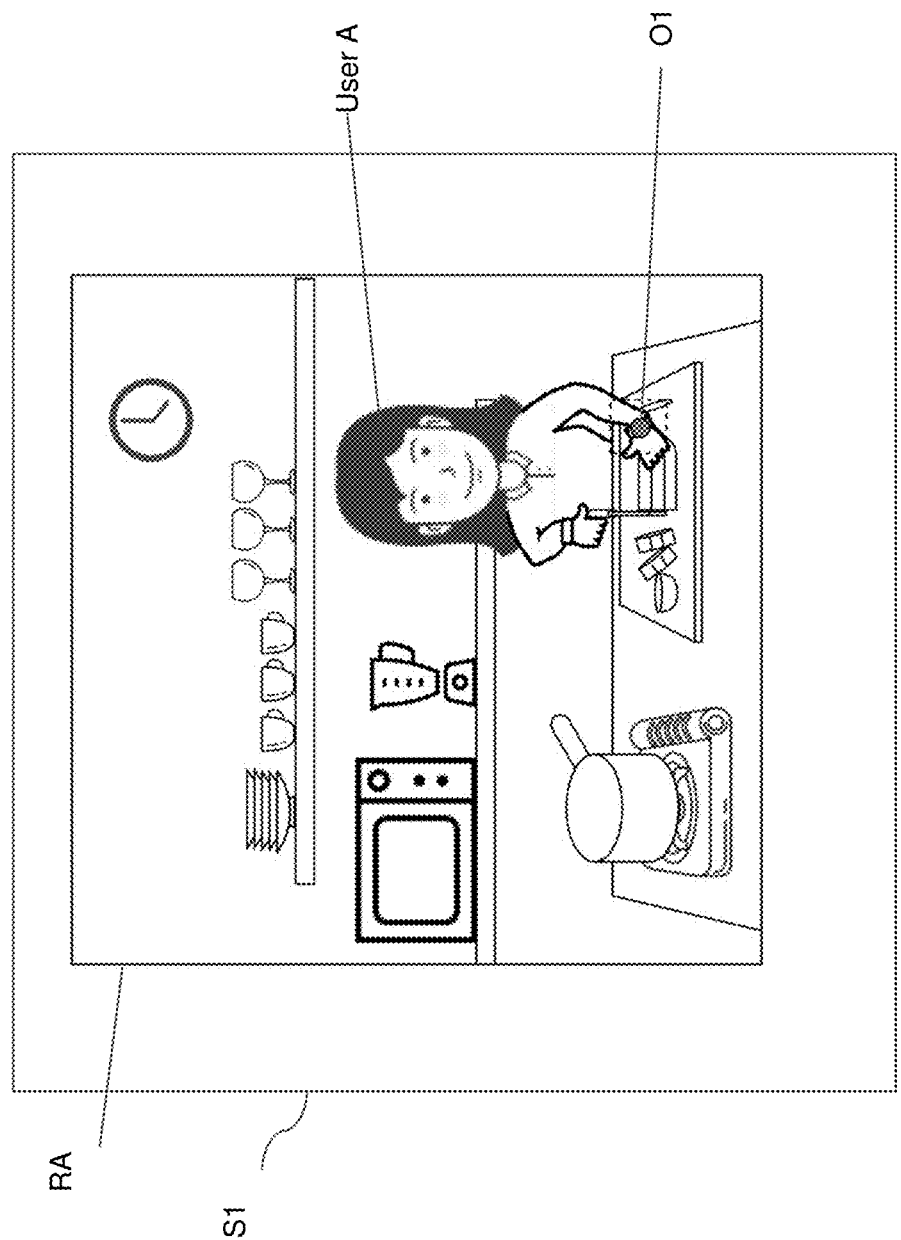

| Look-up table | |
|---|---|
| Predetermined word | object |
| zoom-in | User's hand |
| pan | pan |
| Board please | Chopping board |

FIG. 22

SYSTEM, METHOD AND COMPUTER-READABLE MEDIUM FOR VIDEO PROCESSING

CROSS-REFERENCE TO RELATED APPLICATIONS

This application claims priority under 35 U.S.C. § 111(a) and is a continuation-in-part of International Patent Application No. PCT/US2021/052779, filed on 30 Sep. 2021, is a continuation-in-part of International Patent Application No. PCT/US2021/073182, filed on 30 Dec. 2021, and is a continuation-in-part of International Patent Application No. PCT/US2021/073183, filed on 30 Dec. 2021. The disclosures of each of the previously listed applications are incorporated herein by reference in their entireties.

FIELD

The present disclosure relates to image processing or video processing in a live video streaming or a video conference call.

This disclosure also relates to video processing in a video streaming.

BACKGROUND

Various technologies for enabling users to participate in mutual on-line communication are known. The applications include live streaming, live conference calls and the like. As these applications increase in popularity, user demand for improved interactive experience during the communication is rising. User demand for smoother synchronization, for improved communication efficiency and better understanding of each other's message are also rising.

SUMMARY

A method according to one embodiment of the present disclosure is a method for video processing. The method includes displaying a live video of a first user in a first region on a user terminal and displaying a video of a second user in a second region on the user terminal. A portion of the live video of the first user extends to the second region on the user terminal A system according to one embodiment of the present disclosure is a system for video processing that includes one or a plurality of processors, and the one or plurality of processors execute a machine-readable instruction to perform: displaying a live video of a first user in a first region on a user terminal and displaying a video of a second user in a second region on the user terminal. A portion of the live video of the first user extends to the second region on the user terminal.

A computer-readable medium according to one embodiment of the present disclosure is a non-transitory computer-readable medium including a program for video processing, and the program causes one or a plurality of computers to execute: displaying a live video of a first user in a first region on a user terminal and displaying a video of a second user in a second region on the user terminal. A portion of the live video of the first user extends to the second region on the user terminal.

A method according to another embodiment of the present disclosure is a method for image recognition. The method includes obtaining a first pattern to be displayed on a user terminal, comparing the first pattern with portions of users displayed on the user terminal, and updating a result of the comparison.

A system according to another embodiment of the present disclosure is a system for image recognition that includes one or a plurality of processors, and the one or plurality of processors execute a machine-readable instruction to perform: obtaining a first pattern to be displayed on a user terminal, comparing the first pattern with portions of users displayed on the user terminal, and updating a result of the comparison.

A computer-readable medium according to another embodiment of the present disclosure is a non-transitory computer-readable medium including a program for image recognition, and the program causes one or a plurality of computers to execute: obtaining a first pattern to be displayed on a user terminal, comparing the first pattern with portions of users displayed on the user terminal, and updating a result of the comparison.

A method according to yet another embodiment of the present disclosure is a method for live video processing. The method includes receiving a message from a user, and enlarging a region of the live video in the vicinity of a predetermined object.

A system according to yet another embodiment of the present disclosure is a system for live video processing that includes one or a plurality of processors, and the one or plurality of processors execute a machine-readable instruction to perform: receiving a message from a user, and enlarging a region of the live video in the vicinity of a predetermined object.

A computer-readable medium according to yet another embodiment of the present disclosure is a non-transitory computer-readable medium including a program for live video processing, and the program causes one or a plurality of computers to execute: receiving a message from a user, and enlarging a region of the live video in the vicinity of a predetermined object.

BRIEF DESCRIPTION OF THE DRAWINGS

FIG. 20 shows an exemplary streaming in accordance with some embodiments of the present disclosure.

FIG. 22 shows an exemplary look-up table in accordance with some embodiments of the present disclosure.

DETAILED DESCRIPTION

Some live streaming services, applications (APP) or platforms allow multiple users (such as streamers, viewers, broadcasters and anchors) to participate in a group call mode or a conference call mode, wherein videos of the multiple users are shown simultaneously on the screen of a user terminal displaying the group call or participating in the group call. The user terminal can be a smartphone, a tablet, a personal computer or a laptop with which one of the users participates in the group call.

Figure 1:
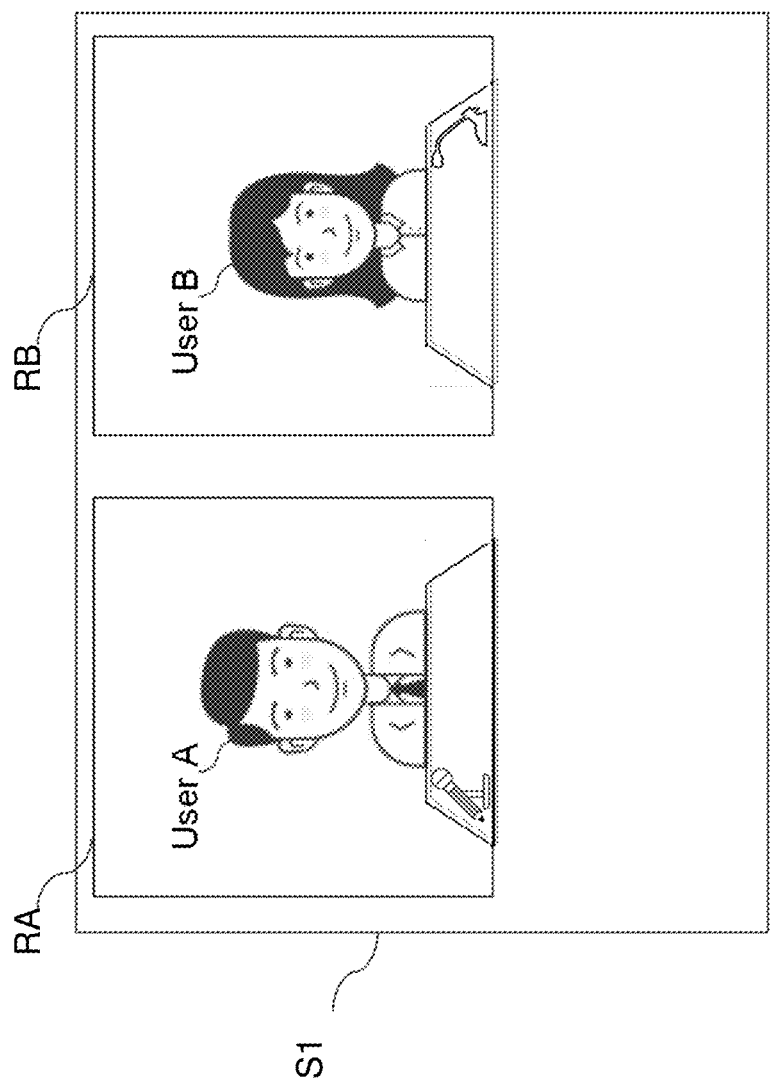
FIG. 1 shows an example of a group call.

FIG. 1 shows an example of a group call. S1 is a screen of a user terminal displaying the group call. RA is a region within the screen S1 displaying a live video of a user A. RB is a region within the screen S1 displaying a live video of a user B. The live video of user A may be taken and provided by a video capturing device, such as a camera, positioned in the vicinity of user A. The live video of user B may be taken and provided by a video capturing device, such as a camera, positioned in the vicinity of user B.

Conventionally, the video of user A can only be shown in region RA, and cannot be shown in region RB. Likewise, the video of user B can only be shown in region RB, and cannot be shown in region RA. That may cause inconvenience or hinder some applications during the communication. For example, in an exemplary scenario that user B is presenting a newly developed product to user A in the group call, user A cannot precisely point out a portion or a part of the product for detailed discussion. Therefore, it is desired to have more interaction during a group call or a conference call.

Figure 2:
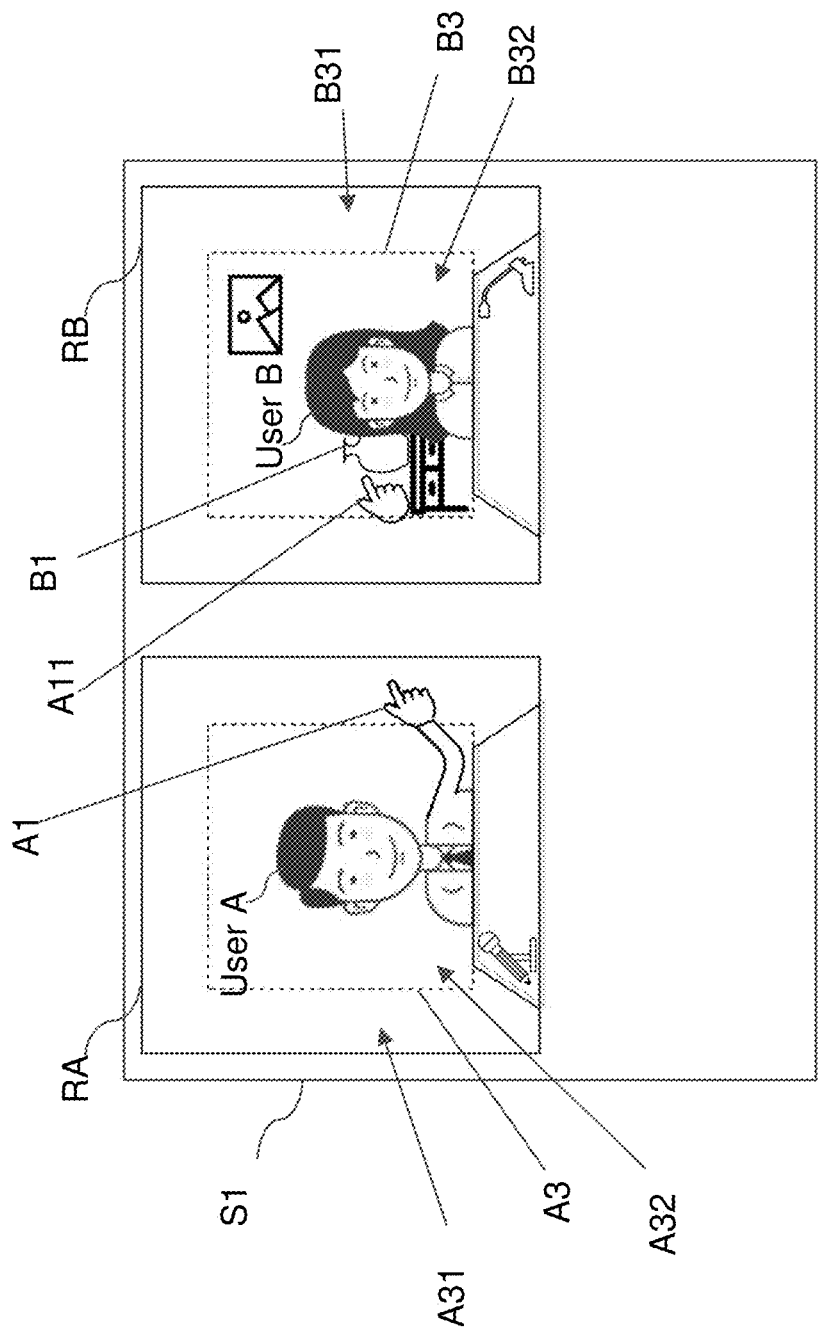
FIG. 2 shows an example of a group call in accordance with some embodiments of the present disclosure.

FIG. 2 shows an example of a group call in accordance with some embodiments of the present disclosure. As shown in FIG. 2, a portion A1 of user A extends to or is reproduced/duplicated in the region RB wherein user B is displayed. In this embodiment, the portion A1 is a hand of user A in region RA, and the portion A11 is the extended, reproduced or duplicated version of the portion A1 displayed in region RB. The portion A11 points to or is directed toward an object B1 in region RB. In some embodiments, the video of user B shown in region RB is a live video. In some embodiments, the video of user B shown in region RB is a replayed video.

In some embodiments, the portion A11 follows the movement or the trajectory of the portion A1. In some embodiments, the portion A11 moves synchronously with the portion A1. The user A may control or move the portion A11 to point to a position in region RB about which the user A wants to discuss by simply moving his hand, which is the portion A1. In some embodiments, the portion A11 may be represented or displayed as a graphical object or an animated object.

As shown in FIG. 2, there is a boundary A3 within region RA. The boundary A3 defines a region A31 and a region A32 within region RA. In this embodiment, the region A31 surrounds the region A32. The region A31 may be referred to as or defined as an interactive region. The portion A1, which extends to or is reproduced in region RB, is within the interactive region A31. The portion A1 extends towards user B in region RA. In some embodiments, only portions in the interactive region A31 can be extended to or displayed in region RB. In some embodiments, if user A wants to interact with user B by extending a portion of user A to region RB, user A simply moves the portion to the interactive region A31 and the portion will then be displayed in region RB. In this embodiment, the region RA and the region RB are separated from each other. In some embodiments, the region RA and the region RB may be at least partially overlapped on the screen S1.

As shown in FIG. 2, there is a boundary B3 within region RB. The boundary B3 defines a region B31 and a region B32 within region RB. In this embodiment, the region B31 surrounds the region B32. The region B31 may be referred to as or defined as an interactive region. In some embodiments, portions in the interactive region B31 can be extended to or displayed in region RA. In some embodiments, if user B wants to interact with user A by extending a portion of user B to region RA, user B simply moves the portion to the interactive region B31 and the portion will then be displayed in region RA. In some embodiments, the boundary A3 and/or the boundary B3 may not be displayed on the region RA and/or the region RB.

In FIG. 2, user A and user B, or region RA and region RB, are aligned in a lateral direction on the screen S1 of the user terminal, and the portion A1 of the live video of user A extends towards user B in the region RA.

Figure 3:
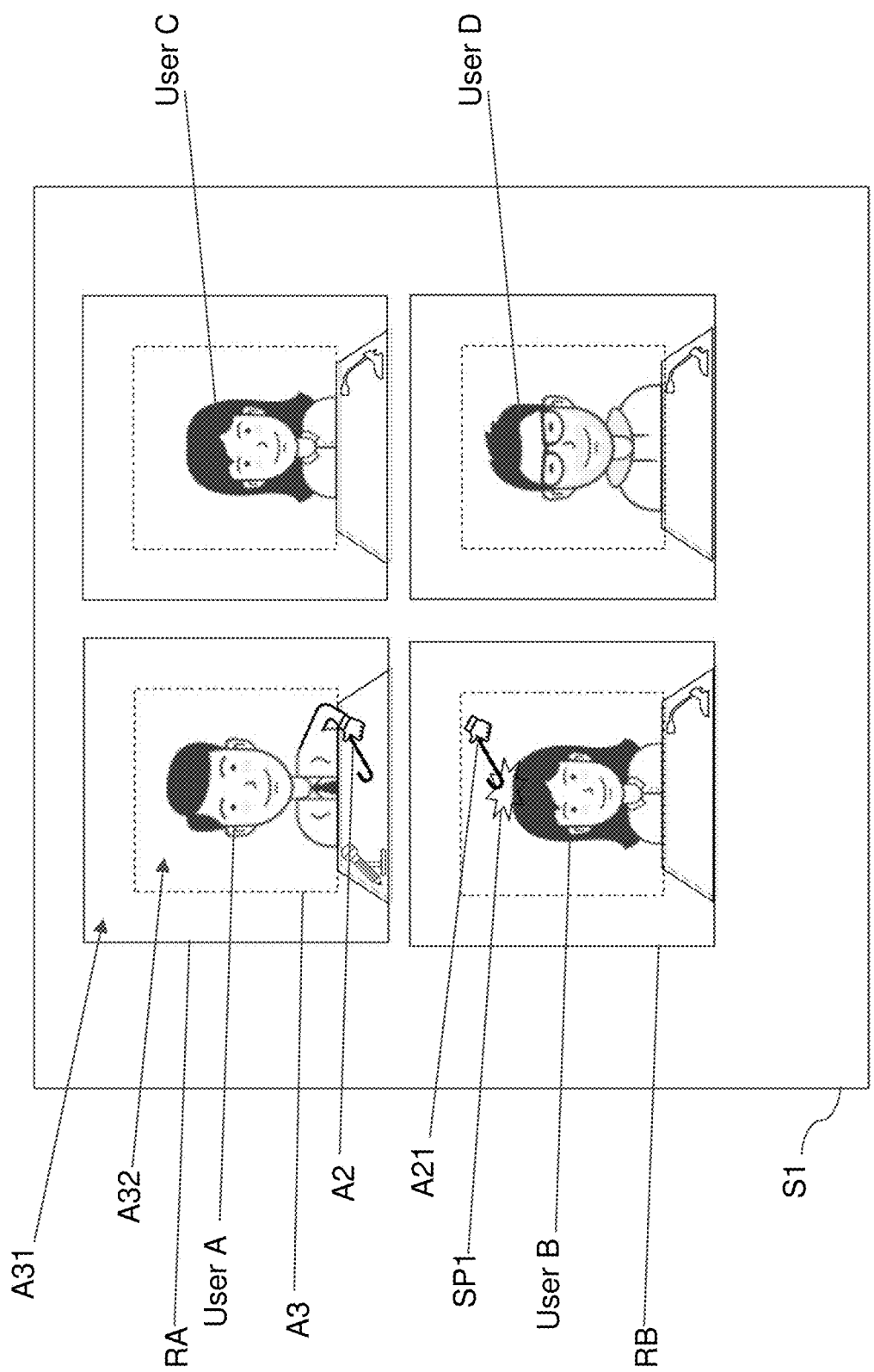
FIG. 3 shows an example of a group call in accordance with some embodiments of the present disclosure.

FIG. 3 shows another example of a group call in accordance with some embodiments of the present disclosure. There are at least four users, user A, user B, user C and user D, participating in the group call. In FIG. 3, user A and user B are aligned in a vertical direction on the screen Si of the user terminal. As shown in FIG. 3, a portion A2 of user A extends to or is reproduced/duplicated in the region RB wherein user B is displayed. In this embodiment, the portion A2 includes a hand of user A and an object held by the hand, and the portion A21 is the extended, reproduced or duplicated version of the portion A2 displayed in region RB. The portion A21 approaches or is directed toward user B in region RB. A special effect SP1 is displayed in region RB when the portion A21 touches user B. The special effect SP1 may include a graphical object or an animated object. In some embodiments, the special effect SP1 may include a sound effect.

In some embodiments, the portion A21 follows the movement or the trajectory of the portion A2. In some embodiments, the portion A21 moves synchronously with the portion A2. The user A may control or move the portion A21 to point to or touch a position in region RB with which the user A wants to interact by simply moving his hand, which may hold an object. In some embodiments, the portion A21 may be represented or displayed as a graphical object or an animated object.

As shown in FIG. 3, there is a boundary A3 within region RA. The boundary A3 defines a region A31 and a region A32 within region RA. In this embodiment, the region A31 surrounds the region A32. The region A31 may be referred to as or defined as an interactive region. The portion A2, which extends to or is reproduced in region RB, is within the interactive region A31. The portion A2 extends towards user B in region RA. In some embodiments, only portions in the interactive region A31 can be extended to or displayed in region RB. In some embodiments, if user A wants to interact with user B by extending a portion of user A to region RB, user A simply moves the portion to the interactive region A31, and the portion will then be displayed in region RB.

Figure 4:
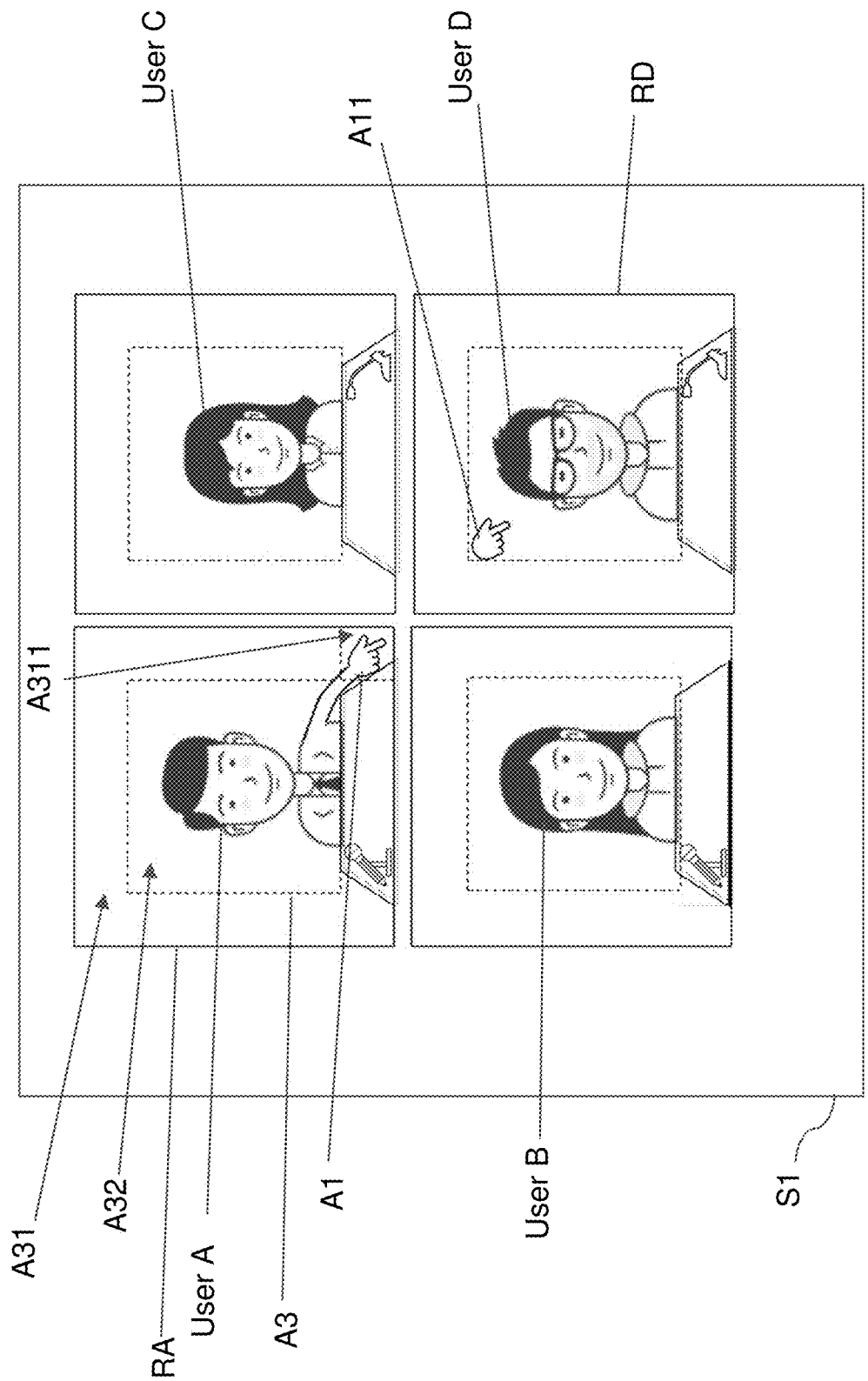
FIG. 4 shows an example of a group call in accordance with some embodiments of the present disclosure.

FIG. 4 shows another example of a group call in accordance with some embodiments of the present disclosure. There are at least four users, user A, user B, user C and user D, participating in the group call. In FIG. 4, user A and user D are aligned in a diagonal direction on the screen S1 of the user terminal. As shown in FIG. 4, a portion A1 of user A extends to or is reproduced/duplicated in the region RD wherein user D is displayed. In this embodiment, the portion A1 is a hand of user A, and the portion A11 is the extended, reproduced or duplicated version of the portion A1 displayed in region RD. The portion A11 points to or is directed toward user D in region RD.

In some embodiments, the portion A11 follows the movement or the trajectory of the portion A1. In some embodiments, the portion A11 moves synchronously with the portion A1. The user A may control or move the portion A11 to point to a position in region RD about which the user A wants to interact by simply moving his hand, which is the portion A1. In some embodiments, the portion A11 may be represented or displayed as a graphical object or an animated object.

As shown in FIG. 4, there is a boundary A3 within region RA. The boundary A3 defines a region A31 and a region A32 within region RA. The region A31 surrounds the region A32. The region A31 may be referred to as or defined as an interactive region. In this embodiment, the interactive region A31 includes a subregion A311. The portion Al, which extends to or is reproduced in region RD, is within the subregion A311. The subregion A311 is between user A and user D. The subregion A311 is located in a position of region RA that faces towards region RD from user A's point of view.

As shown in the examples in FIG. 2, FIG. 3 and FIG. 4, a direction towards which a portion of user A extends in region RA may determine the region wherein the extended, duplicated or reproduced version of the portion of user A is displayed. Therefore, user A may determine which region (and the corresponding user) to interact with by simply moving or extending the portion of user A towards the corresponding direction. For example, user A may extend a portion in a lateral direction to interact with a user whose display region is aligned or positioned in a lateral direction with respect to user A on the screen S1. In another example, user A may extend a portion in a vertical direction to interact with a user whose display region is aligned or positioned in a vertical direction with respect to user A on the screen S1. In yet another example, user A may extend a portion in a diagonal direction to interact with a user whose display region is aligned or positioned in a diagonal direction with respect to user A on the screen S1.

Figure 5:
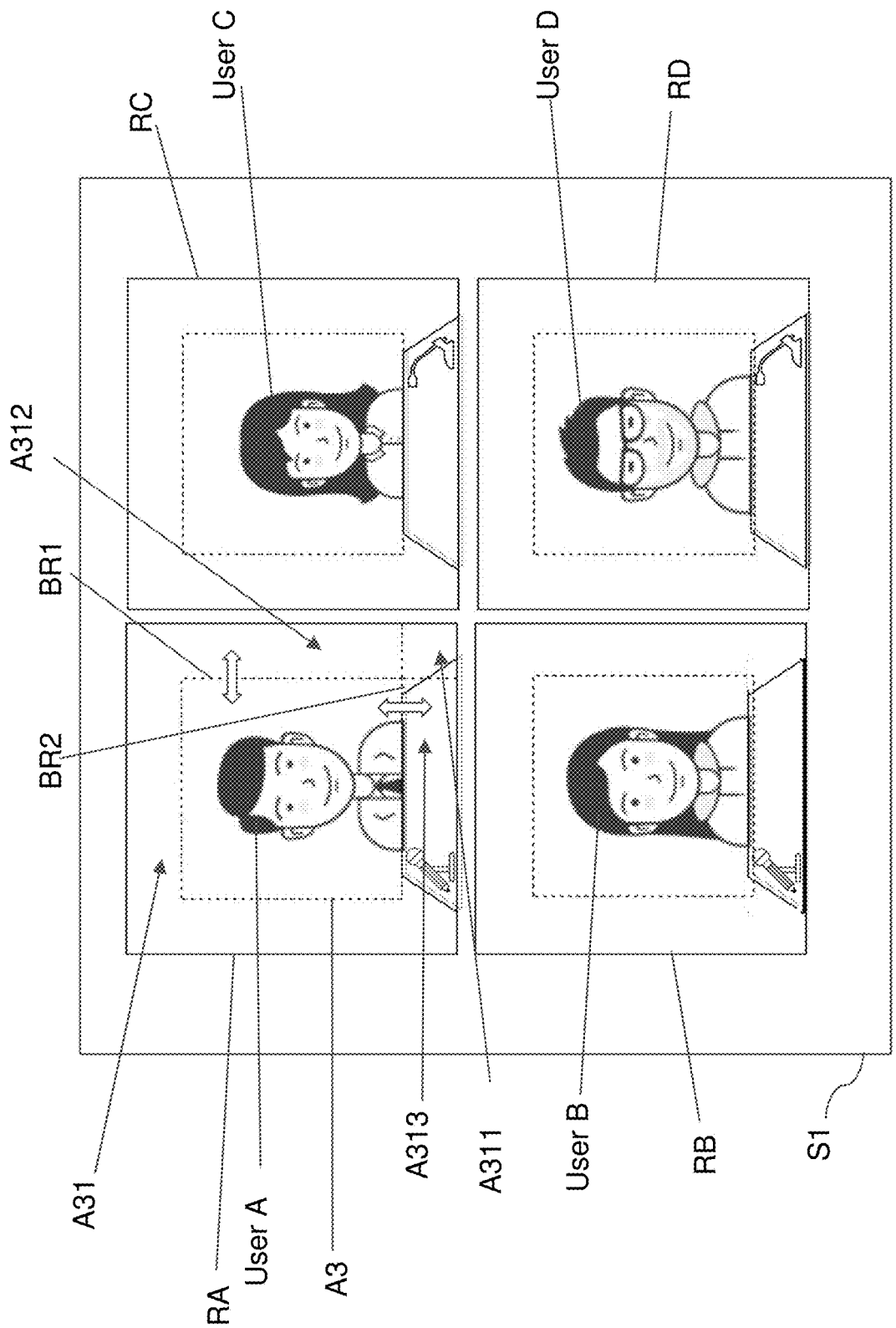
FIG. 5 shows an example of a group call in accordance with some embodiments of the present disclosure.

In some embodiments, a user may adjust the shape of the interactive region for more convenient interaction with another user. FIG. 5 shows another example of a group call in accordance with some embodiments of the present disclosure. There are at least four users, user A, user B, user C and user D, participating in the group call. As shown in FIG. 5, the boundary A3 defines the interactive region A31, which is a region user A utilizes to interact with other users, as described in previous exemplary embodiments. The interactive region A31 includes a subregion A311. The boundary A3 includes at least a border BR1 and a border BR2. In some embodiments, when user A wants to have more convenient interaction with another user, user A may adjust a position of the border BR1 and/or a position of the border BR2 to adjust the shape of the interactive region A31 and the shape of the subregion A311. The border BR1 corresponds to a direction of user C or the region RC with respect to the region RA, and is between the region RA and the region RC. The border BR2 corresponds to a direction of user B or the region RB with respect to the region RA, and is between the region RA and the region RB.

For example, user A may drag or move the border BR1 closer to user A, such that a subregion A312 of the interactive region A31 that is between user A and user C becomes wider and closer to user A. In this way, it is easier for user A to interact with user C with a portion of user A. User A only needs to extend the portion of user A for a relatively shorter distance to cross the border BR1 and reach the subregion A312 of the interactive region A31, and then the portion will be extended, duplicated or reproduced in region RC wherein user C is displayed.

For another example, user A may drag or move the border BR2 closer to user A, such that a subregion A313 of the interactive region A31 that is between user A and user B becomes wider and closer to user A. In this way, it is easier for user A to interact with user B with a portion of user A. User A only needs to extend the portion of user A for a relatively shorter distance to cross the border BR2 and reach the subregion A312 of the interactive region A31, and then the portion will be extended, duplicated or reproduced in region RB wherein user B is displayed.

For yet another example, user A may drag or move the border BR1 and/or the border BR2 closer to user A, such that the subregion A311 of the interactive region A31 that is between user A and user D becomes wider and closer to user A. In this way, it is easier for user A to interact with user D with a portion of user A. User A only needs to extend the portion of user A for a relatively shorter distance in a diagonal direction to reach the subregion A311 of the interactive region A31, and then the portion will be extended, duplicated or reproduced in region RD wherein user D is displayed.

Figure 6:
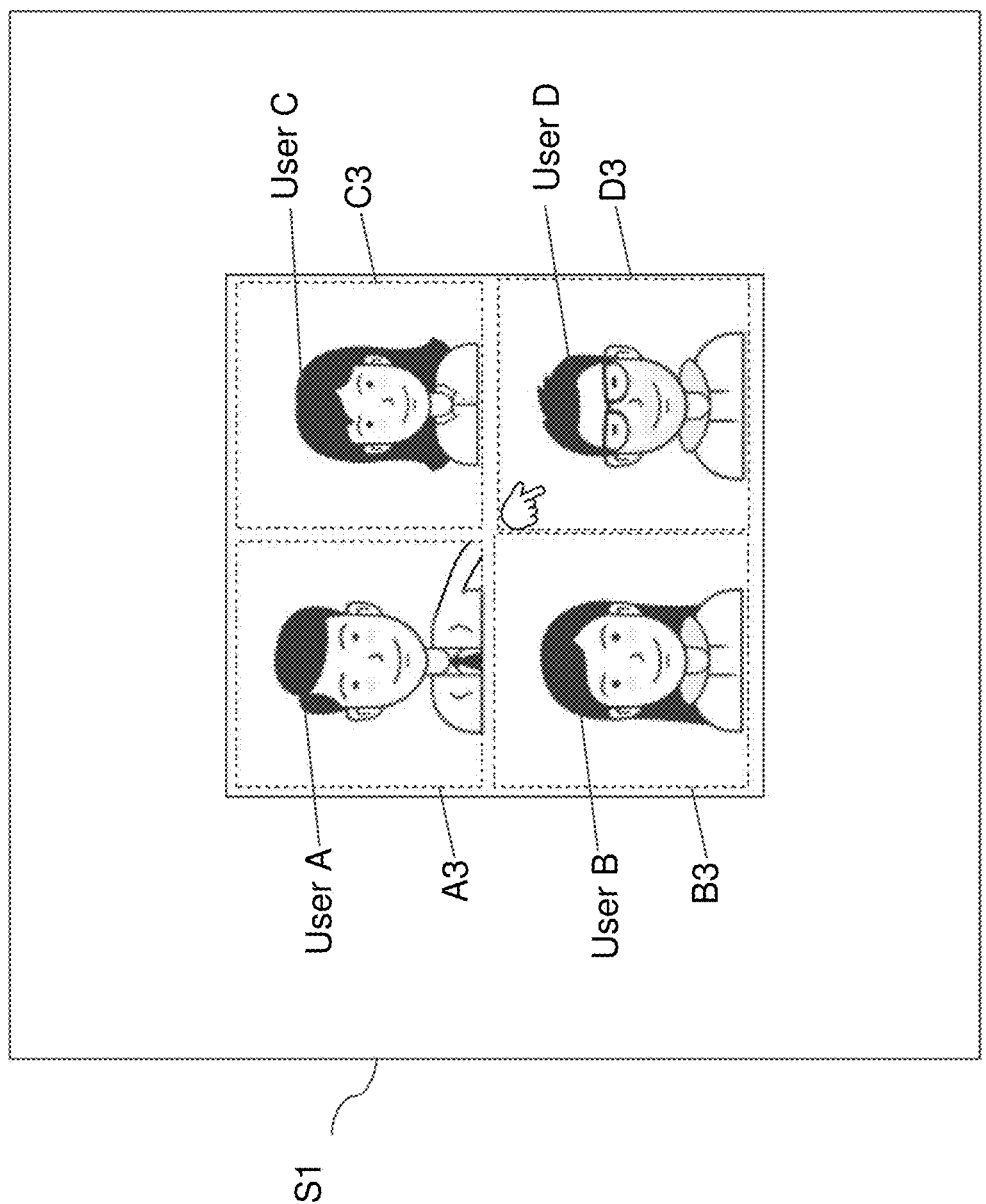
FIG. 6 shows an example of a group call in accordance with some embodiments of the present disclosure.

FIG. 6 shows another example of a group call in accordance with some embodiments of the present disclosure. In some embodiments, only outside of the interactive region are extracted to be displayed on the screen S1. More specifically, for user A, only the region enclosed by the boundary A3 is shown on the screen S1. for user B, user C and user D, only the regions enclosed by the boundary B3, C3 and D3 are shown on the screen S1. By means of that, it may improve the realism of the interaction. For example, when user A extends a portion to another user's display region, the portion will not be shown in user A's display region.

Figure 7:
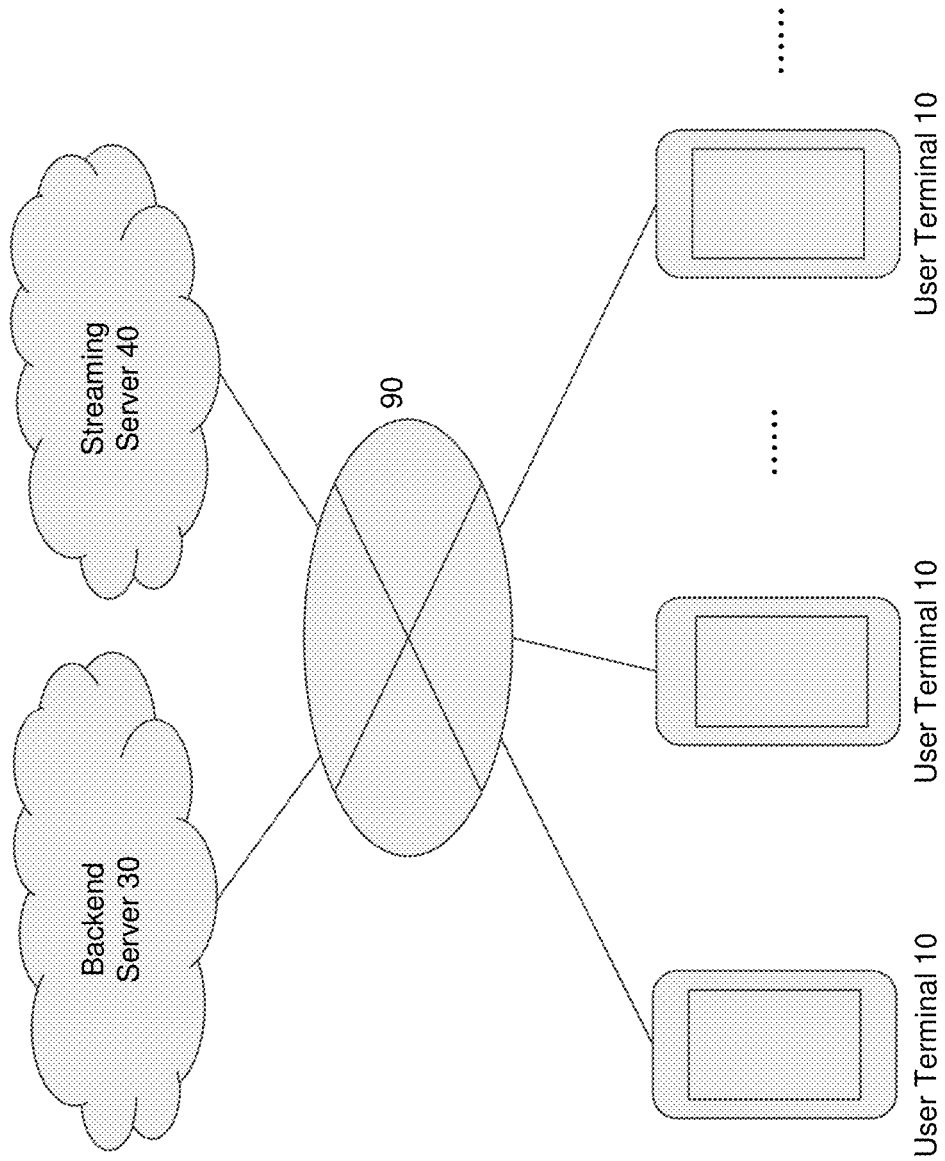
FIG. 7 shows a schematic configuration of a communication system according to some embodiments of the present disclosure.

FIG. 7 shows a schematic configuration of a communication system 1 according to some embodiments of the present disclosure. The communication system 1 may provide a live streaming service with interaction via a content. Here, the term "content" refers to a digital content that can be played on a computer device. The communication system 1 enables a user to participate in real-time interaction with other users on-line. The communication system 1 includes a plurality of user terminals 10, a backend server 30, and a streaming server 40. The user terminals 10, the backend server 30 and the streaming server 40 are connected via a network 90, which may be the Internet, for example. The backend server 30 may be a server for synchronizing interaction between the user terminals and/ or the streaming server 40. In some embodiments, the backend server 30 may be referred to as the origin server of an application (APP) provider. The streaming server 40 is a server for handling or providing streaming data or video data. In some embodiments, the backend server 30 and the streaming server 40 may be independent servers. In some embodiments, the backend server 30 and the streaming server 40 may be integrated into one server. In some embodiments, the user terminals 10 are client devices for the live streaming. In some embodiments, the user terminal 10 may be referred to as viewer, streamer, anchor, podcaster, audience, listener or the like. Each of the user terminal 10, the backend server 30, and the streaming server 40 is an example of an information-processing device. In some embodiments, the streaming may be live streaming or video replay. In some embodiments, the streaming may be audio streaming and/or video streaming. In some embodiments, the streaming may include contents such as online shopping, talk shows, talent shows, entertainment events, sports events, music videos, movies, comedy, concerts, group calls, conference calls or the like.

Figure 8:
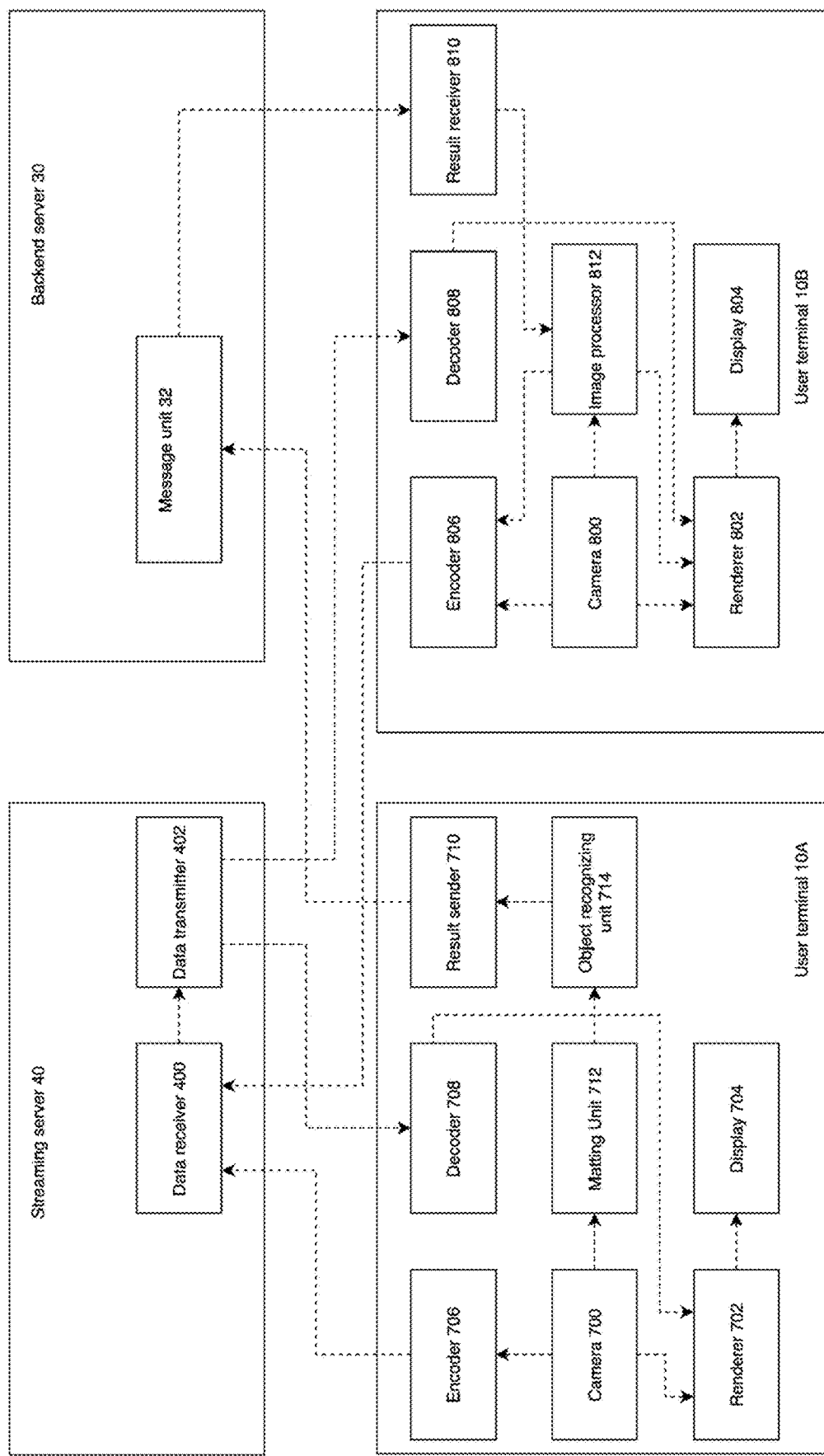
FIG. 8 shows an exemplary functional configuration of a communication system according to some embodiments of the present disclosure.

FIG. 8 shows an exemplary functional configuration of a communication system according to some embodiments of the present disclosure. In FIG. 8, the network 90 is omitted.

The backend server 30 includes a message unit 32. The message unit 32 is configured to receive data or information from user terminals, process and/or store those data, and transmit the data to user terminals. In some embodiments, the message unit 32 may be a separate unit from the backend server 30.

The streaming server 40 includes a data receiver 400 and a data transmitter 402. The data receiver 400 is configured to receive data or information from various user terminals, such as streaming data or video data. The data transmitter 402 is configured to transmit data or information to user terminals, such as streaming data or video data.

The user terminal 10A may be a user terminal operated by a user A. The user terminal 10A includes a camera 700, a renderer 702, a display 704, an encoder 706, a decoder 708, a result sender 710, a matting unit 712, and an object recognizing unit 714.

The camera 700 may be or may include any type of video capturing device. The camera 700 is configured to capture video data of, for example, user A.

The renderer 702 is configured to receive video data from the camera 700 (video data of user A), to receive video data from the decoder 708 (which may include video data from user B), and to generate a rendered video (such as a video displaying a group call wherein user A and user B are displayed) that is to be displayed on the display 704.

The display 704 is configured to display the rendered video from the renderer 702. In some embodiments, the display 704 may be a screen on the user terminal 10A.

The encoder 706 is configured to encode the video data from camera 700, and transmit the encoded video data to the data receiver 400 of the streaming server 40. The encoded data may be transmitted as streaming data.

The decoder 708 is configured to receive video data or streaming data (which may include video data from user B) from the data transmitter 402 of the streaming server 40, decode them into decoded video data, and transmit the decoded video data to the renderer 702 for rendering.

The matting unit 712 is configured to perform a matting process (image matting or video matting) on the video data from the camera 700, which is video data of user A. The matting process may include a contour recognizing process, an image comparison process, a moving object detection process, and/or a cropping process. The matting process may be executed with techniques including constant-color matting, difference matting, and natural image matting. The algorithms involved in the matting process may include Bayesian matting, Poisson matting, or Robust matting. In some embodiments, the image comparison process periodically compares an initial or default background image with a current or live image to detect a portion of user A in an interactive region.

For example, the matting unit 712 receives video data of user A from camera 700. The video data may include an interactive region as described above with examples in FIG. 2, FIG.3, FIG. 4 and FIG. 5. In some embodiments, the matting unit 712 performs a matting process to detect or to extract a contour of user A in the video data. In some embodiments, the matting unit 712 performs a matting process to detect or to extract a portion of user A in the interactive region (such as a hand of user A, or a hand of user A holding an object). In some embodiments, the matting unit 712 performs a cropping process to remove a region or a portion outside of the interactive region from the video data of user A. In some embodiments, the matting unit 712 detects, recognizes or determines a position in the interactive region wherein the portion of user A is detected. In some embodiments, a contour recognizing process or an image comparison process may be performed before a cropping process, which may improve an accuracy of the detection of the portion of user A in the interactive region.

In some embodiments, the interactive region, and the corresponding boundary or border, may be defined by a processor (not shown) of the user terminal 10A or an application enabling the group call. In some embodiments, the interactive region, and the corresponding boundary or border, may be determined by user A by a UI (user interface) unit (not shown) of the user terminal 10A. In some embodiments, the matting unit 712 detects or determines the portion of user A (or the portion of the live video of user A) in the interactive region by detecting a portion of user A crossing a border in the region RA. The border in the region RA could be, for example, the border BR1 or the border BR2 in FIG. 5.

The object recognizing unit 714 is configured to perform an object recognizing process on the output data from the matting unit 712. The output data may include a detected portion or an extracted portion of user A (such as a hand of user A, or a hand of user A holding an object). The object recognizing unit 714 performs the object recognizing process to determine if the detected portion of user A includes any predetermined pattern, object and/or gesture. In some embodiments, the object recognizing process may include techniques such as template matching, pattern matching, contour matching, gesture recognizing, skin recognizing, outline matching, color or shape matching, and feature based matching. In some embodiments, the object recognizing unit 714 calculates a matching correlation between the detected portion of user A (or a part of which) and a set of predetermined patterns to determine if any pattern is matched or recognized within the detected portion of user A. In some embodiments, the object recognizing unit 714 detects, recognizes or determines a position in the interactive region wherein the portion of user A is detected. In some embodiments, the object recognizing process may be performed on an image or video from the matting unit 712 wherein a cropping process is not performed yet, which may improve an accuracy of the object recognizing process. In some embodiments, the object recognizing unit 714 recognizes and extracts the image or video of the portion of user A in the interactive region, and transmits the extracted image or video to the result sender 710.

The result sender 710 is configured to transmit the output result of the object recognizing unit 714 (which may include the output of the matting unit 712) to the message unit 32 of the backend server 30. In some embodiments, the result sender 710 may transmit the output directly to the result receiver 810 instead of transmitting via the message unit 32.

The user terminal 10B may be a user terminal operated by a user B. The user terminal 10B includes a camera 800, a renderer 802, a display 804, an encoder 806, a decoder 808, a result receiver 810, and an image processor 812.

The camera 800 may be or may include any type of video capturing device. The camera 800 is configured to capture video data of, for example, user B. The camera 800 transmits the captured video data to the encoder 806, the renderer 802, and/or the image processor 812.

The renderer 802 is configured to receive video data from the camera 800 (e.g., video data of user B), to receive video data from the decoder 808 (which may include video data from another user such as user A), to receive output data of the image processor 812, and to generate a rendered video (such as a video displaying a group call wherein user A and user B are displayed) that is to be displayed on the display 804.

The display 804 is configured to display the rendered video from the renderer 802. In some embodiments, the display 804 may be a screen on the user terminal 10B.

The encoder 806 is configured to encode data, which includes the video data from the camera 800, and/or video data from the image processor 812. The encoder 806 transmits the encoded video data to the data receiver 400 of the streaming server 40. The encoded data may be transmitted as streaming data.

The decoder 808 is configured to receive video data or streaming data (which may include video data from user A) from the data transmitter 402 of the streaming server 40, decode them into decoded video data, and transmit the decoded video data to the renderer 802 for rendering.

The result receiver 810 is configured to receive output data from the message unit 32 of the backend server 30, and transmit the data to the image processor 812. The output data from the message unit 32 includes data or information from the matting unit 712 and the object recognizing unit 714. In some embodiments, the output data from the message unit 32 includes a result of the object recognizing process executed by the object recognizing unit 714. For example, the output data from the message unit 32 may include information regarding a matched or recognized pattern, object or gesture. In some embodiments, the output data from the message unit 32 includes information regarding a position in the interactive region (on the user terminal 10A) wherein the portion of user A is detected, for example, by the matting unit 712 of the user terminal 10A or the object recognizing unit 714. In some embodiments, the output data from the message unit 32 includes a video or image of a detected/recognized portion of user A in the interactive region.

The image processor 812 is configured to receive video data from the camera 800, and/or data or information from the result receiver 810. In some embodiments, the image processor 812 performs image processing or video processing on the video data received from the camera 800 based on data or information received from the result receiver 810. For example, if the data received from the result receiver 810 indicates that the object recognizing process executed by the object recognizing unit 714 successfully recognized a predetermined pattern in the portion of user A (which is in the interactive region on a screen of the user terminal 10A), the image processor 812 may include, render, or overlap a special effect corresponding to the predetermined pattern onto the video data received from the camera 800. The overlapped video is later transmitted to the renderer 802, and may later be subsequently displayed on the user terminal 804. In some embodiments, the special effect data may be stored in a storage on the user terminal 10B (not shown).

In some embodiments, the message unit 32 determines a destination of output data of the message unit 32 based on data from the matting unit 712 and/or data from the object recognizing unit 714. In some embodiments, the message unit 32 determines the region to extend, duplicate or reproduce the portion of user A based on the position of the portion of user A detected in the interactive region.

For example, referring to FIG. 5, if the position of the interactive region A31 wherein the portion of user A is detected by the matting unit 712 (or the object recognizing unit 714) is within the subregion A312, the message unit 32 may determine the user terminal of user C to be the destination to send the output data of the message unit 32. The portion of user A will then extend to or be duplicated/reproduced/displayed in region RC, which could be done by an image processor of the user terminal of user C.

In another example, if the position of the interactive region A31 wherein the portion of user A is detected by the matting unit 712 is within the subregion A311, the message unit 32 may determine the user terminal of user D to be the destination to send the output data of the message unit 32. The portion of user A will then extend to or be duplicated/reproduced/displayed in region RD, which could be done with cooperation of an image processor and/or a renderer in the user terminal of user D.

In yet another example, if the position of the interactive region A31 wherein the portion of user A is detected by the matting unit 712 is within the subregion A313, the message unit 32 may determine the user terminal of user B to be the destination to send the output data of the message unit 32. The portion of user A will then extend to or be duplicated/reproduced/displayed in region RB, which could be done with cooperation of an image processor and/or a renderer in the user terminal of user B.

In some embodiments, the output data of the message unit 32 may include an image or video of the detected portion of user A in the interactive region of region RA. The image processor 812 may subsequently overlap, duplicate or reproduce the portion of user A onto the video of user B, which is received from the camera 800. In this method, the portion of user A in the interactive region may extend to the region B without being represented as a graphical or animated object.

In some embodiments, the image processor 812 may receive the image or video data of user A through the decoder 808, and then utilize information from the message unit 32 (which may include a range, outline or contour information regarding the portion of user A detected in the interactive region) to overlap, duplicate or reproduce the portion of user A in the interactive region onto the video of user B received from the camera 800. In this method, the portion of user A in the interactive region may extend to the region B without being represented as a graphical or animated object.

In some embodiments, the matting unit 712 and/or the object recognizing unit 714 may not be implemented within the user terminal 10A. For example, the matting unit 712 and the object recognizing unit 714 may be implemented within the backend server 30 or the streaming server 40.

Figure 9:
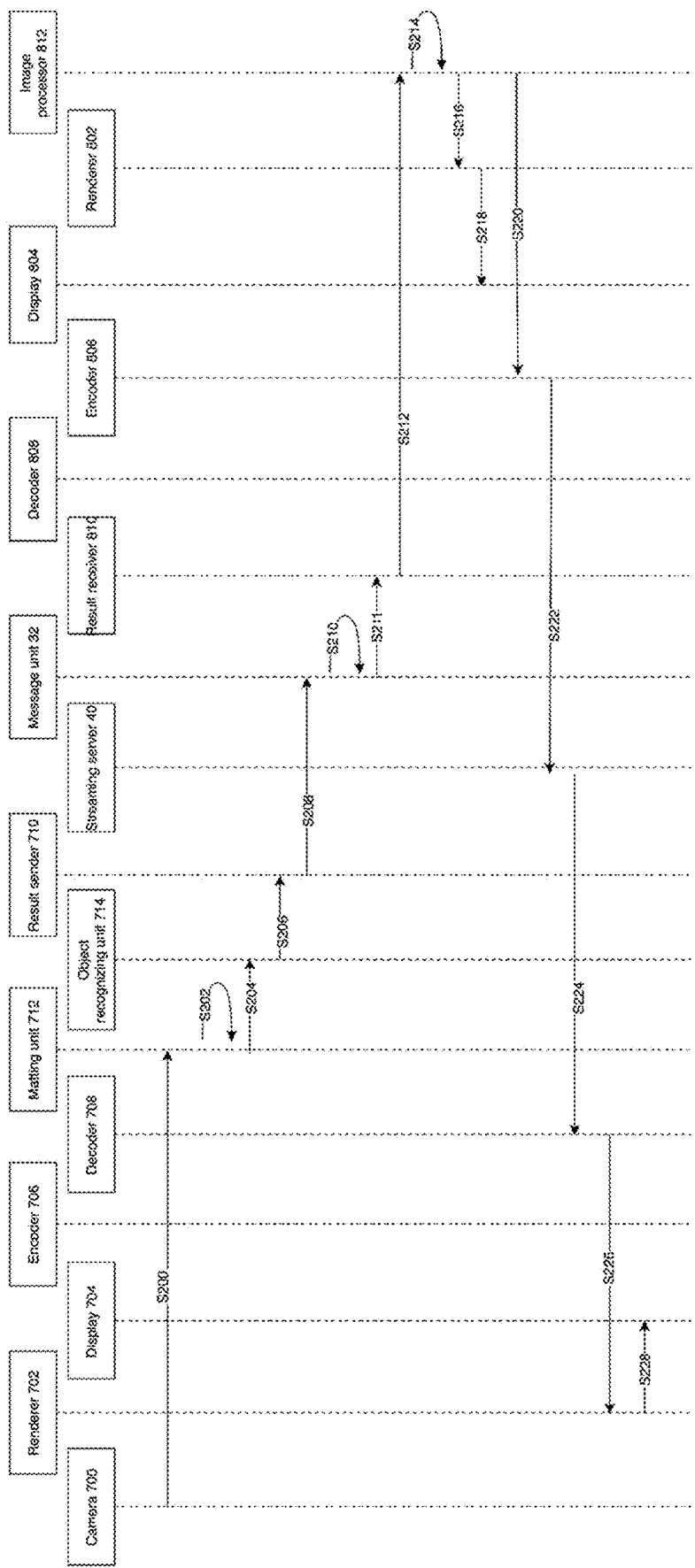
FIG. 9 shows an exemplary sequence chart illustrating an operation of a communication system in accordance with some embodiments of the present disclosure.

FIG. 9 shows an exemplary sequence chart illustrating an operation of a communication system in accordance with some embodiments of the present disclosure. In some embodiments, FIG. 9 illustrates how a portion of a user (for example, user A) extends to a region wherein another user (for example, user B) is displayed.

In step S200, the camera 700 of the user terminal 10A transmits the video data of user A to the matting unit 712 of the user terminal 10A.

In step S202, the matting unit 712 detects a portion of user A in the interactive region on a screen of the user terminal 10A. The detection may include a matting process and/or a cropping process. In some embodiments, the matting unit 712 determines a position within the interactive region wherein the portion of user A is detected.

In step S204, the object recognizing unit 714 of the user terminal 10A receives output data from the matting unit 712, and performs an object recognizing process on the output of the matting unit 712 to determine if any predetermined pattern, gesture or object can be recognized in the detected portion of user A in the interactive region. In some embodiments, the object recognizing process may include a matching process, a gesture recognizing process and/or a skin recognizing process.

In step S206, the object recognizing unit 714 recognizes a predetermined pattern, gesture or object, and then the object recognizing unit 714 collects related information of the predetermined pattern, gesture or object, such as position and size, for determining the destination to whom the data should be transmitted.

In step S208, the output of the object recognizing unit 714 is transmitted to the message unit 32 of the backend server 30 through the result sender 710 of the user terminal 10A.

In step S210, the message unit 32 determines a destination to transmit the data from the user terminal 10A according to information regarding the position of the portion of user A in the interactive region included in the data from the user terminal 10A. The information could be determined in step S206, for example.

In step S211, the message unit 32 transmits the data from the user terminal 10A to the result receiver 810 of the user terminal 10B (in an exemplary scenario that the message unit 32 determines the destination to be user B or region RB).

In step S212, the result receiver 810 transmits the received data to the image processor 812 of the user terminal 10B.

In step S214, the image processor 812 overlaps or superimposes the detected portion of user A (or a portion of the detected portion of user A, which is in the interactive region of region RA), onto the video data of user B. In some embodiments, the image or video data of the detected portion of user A is transmitted to the user terminal 10B through the streaming server 40. In some embodiments, the image or video data of the detected portion of user A is transmitted to the user terminal 10B through the message unit 32. The image or video data of user B is transmitted to the image processor 812 from the camera 800 of the user terminal 10B.

In step S216, the image processor 812 transmits the processed image or video data to the renderer 802 of the user terminal 10B for rendering. For example, the processed image or video data may be rendered together with video data from the decoder 808 of the user terminal 10B and/or video data from the camera 800.

In step S218, the rendered video data is transmitted to the display 804 of the user terminal 10B for displaying on the screen of the user terminal 10B.

In step S220, the image processor 812 transmits the processed image or video data to the encoder 806 of the user terminal 10B for an encoding process.

In step S222, the encoded video data is transmitted to the streaming server 40.

In step S224, the streaming server 40 transmits the encoded video data (from the user terminal 10B) to the decoder 708 of the user terminal 10A for a decoding process.

In step S226, the decoded video data is transmitted to the renderer 702 of the user terminal 10A for a rendering process.

In step S228, the rendered video data is transmitted to the display 804 for displaying on the screen of the user terminal 10A.

The above exemplary processes or steps may be performed continuously or periodically. For example, the matting unit 712 continuously or periodically detects a portion of user A in the interactive region. The object recognizing unit 714 continuously or periodically performs a recognizing process on the portion of user A in the interactive region. The message unit 32 continuously or periodically determines a destination to send the data received from the user terminal 10A. The image processor 812 of the user terminal 10B continuously or periodically performs an overlapping or a superimposing process based on information received from the message unit 32, to make sure the extended or reproduced/ duplicated portion of user A in the region RB moves synchronously with the portion of user A in the region RA. In some embodiments, the user terminal 10B has a processing unit, such as a CPU or a GPU, to determine if the extended or reproduced portion of user A in the region RB touches the image or video of user B. The result of the determination may be utilized by the image processor 812 to decide whether or not to include a special effect in the region RB.

The present disclosure makes conference calls or group calls more convenient, interesting or interactive. The present disclosure can prevent misunderstanding when a user wants to discuss about an object in another user's display region. The present disclosure can boost users' motivation to participate in a group call chat room, which could be in a live streaming form. The present disclosure can attract more streamers or viewers to join in a live streaming group call.

Some live streaming services, applications (APP) or platforms allow multiple users (such as streamers, viewers, broadcasters and anchors) to participate in a group call mode or a conference call mode, wherein videos of the multiple users are shown simultaneously on the screen of a user terminal displaying the group call or participating in the group call. The user terminal can be a smartphone, a tablet, a personal computer or a laptop with which one of the users participates in the group call.

Figure 10:
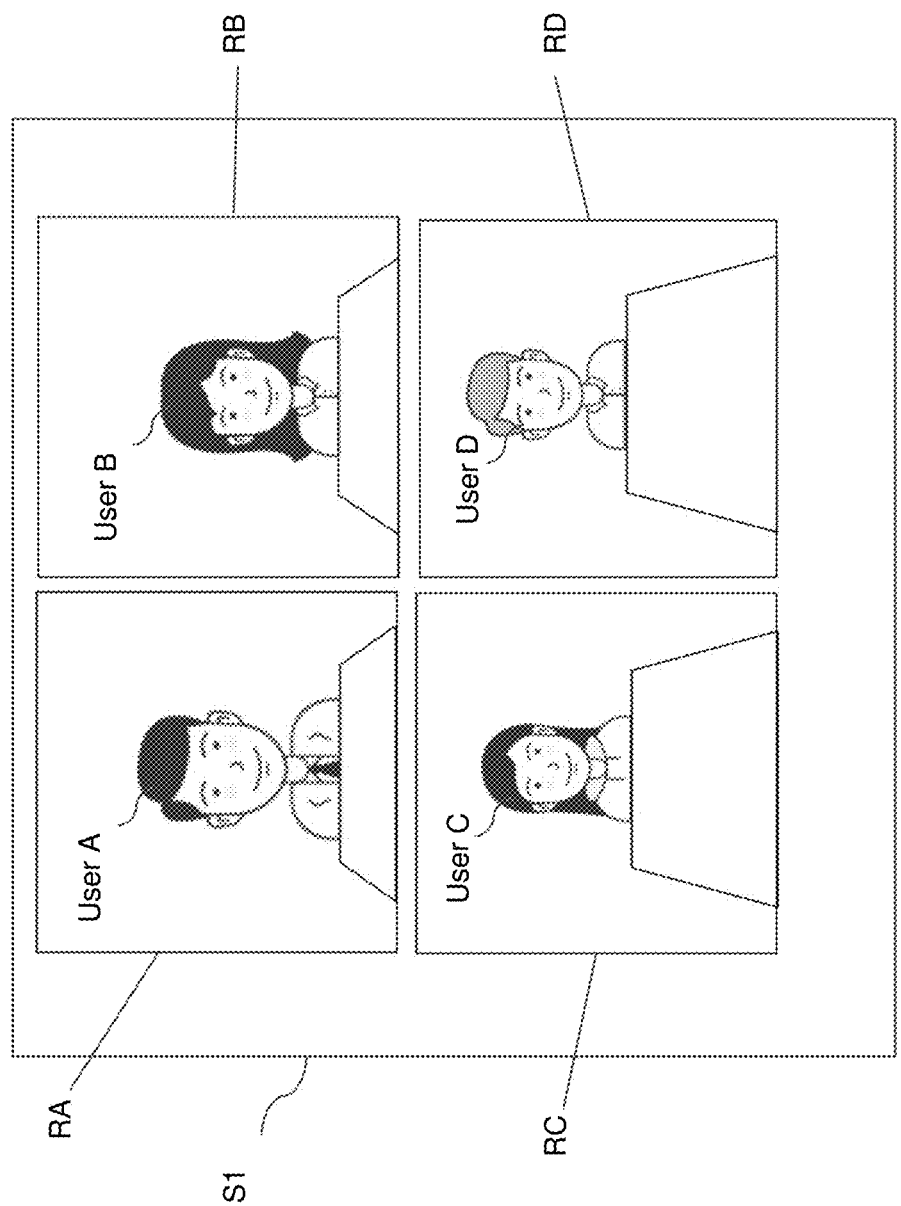
FIG. 10 shows an example of a group call.

FIG. 10 shows an example of a group call. S1 is a screen of a user terminal displaying the group call. RA is a display region within the screen S1 displaying a live video of a user A. RB is a display region within the screen S1 displaying a live video of a user B. RC is a display region within the screen S1 displaying a live video of a user C. RD is a display region within the screen S1 displaying a live video of a user D. The live video of user A may be taken and provided by a video capturing device, such as a camera, positioned in the vicinity of user A. The live video of user B may be taken and provided by a video capturing device, such as a camera, positioned in the vicinity of user B. The live video of user C may be taken and provided by a video capturing device, such as a camera, positioned in the vicinity of user C. The live video of user D may be taken and provided by a video capturing device, such as a camera, positioned in the vicinity of user D.

Conventionally, users A, B, C and D behave in their respective display regions and a collective interaction across different display regions is lacking. In order to boost the motivation for users to join a group call, a more collective or interesting interaction is desirable.

Conventionally, when there is a latency, delay or asynchronous issue occuring in the connection between users A, B, C and D during the group call, one user may not realise the connection issue immediately and keeps talking while the others can't receive his or her message (voice or video) synchronously or smoothly. Or, when there is a concern or a suspicion that an asynchronous issue may be happening, there is no convenient way to test or clarify it for the users. Therefore, it is desirable for users to be able to start or initiate a convenient way to test the synchronization status of the group call connection.

Figure 11A:
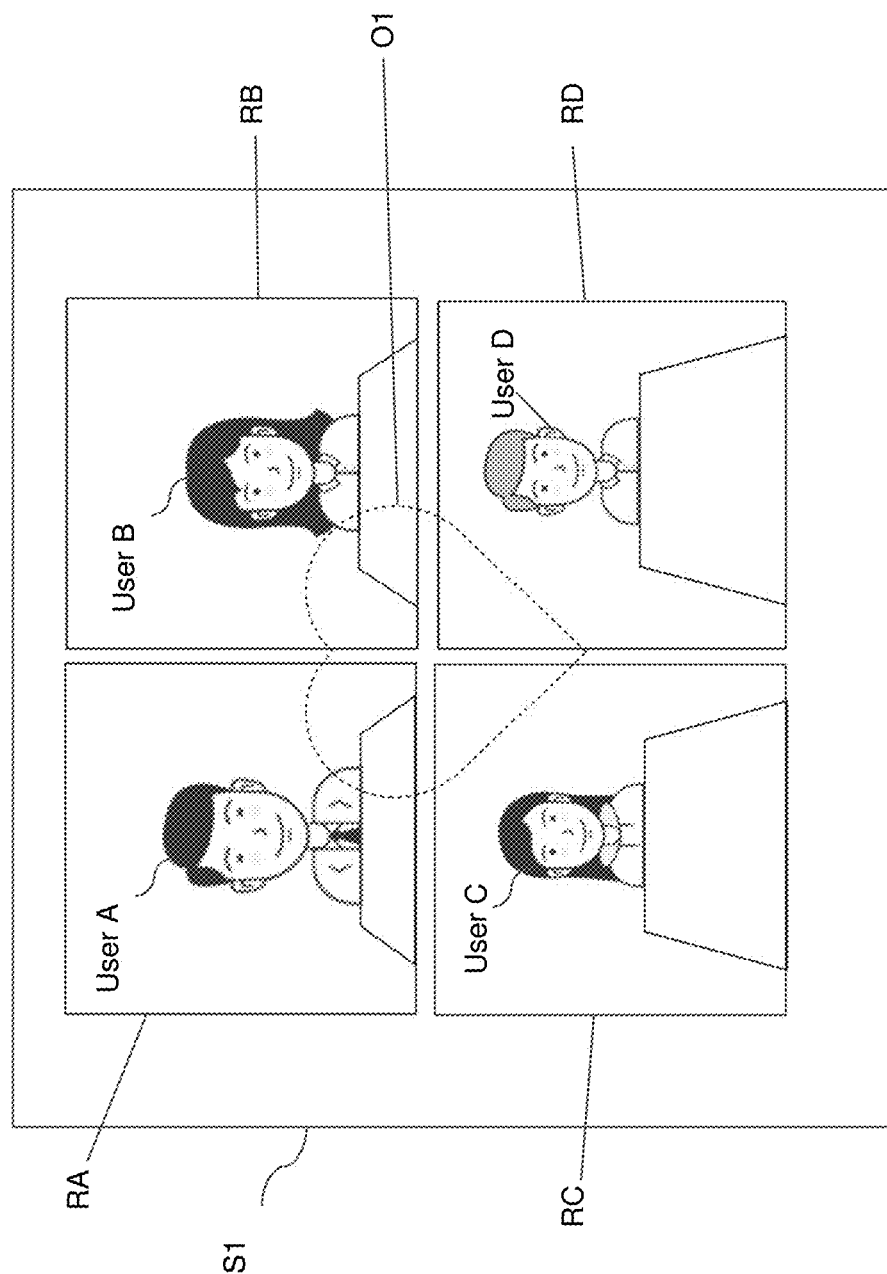
FIG. 11A, FIG. 11B and FIG. 11C show an exemplary interaction in a group call in accordance with some embodiments of the present disclosure.
Figure 11B:
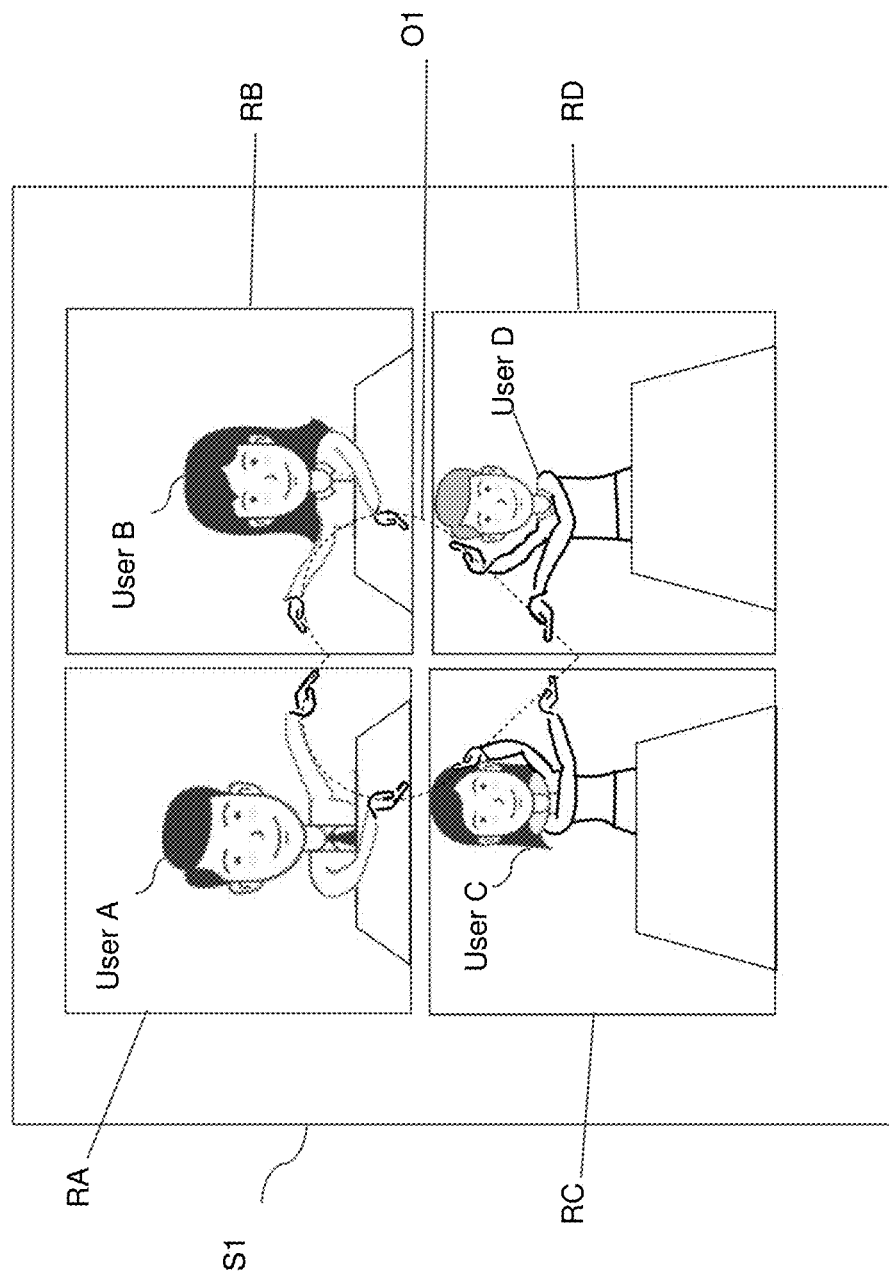
Figure 11C:
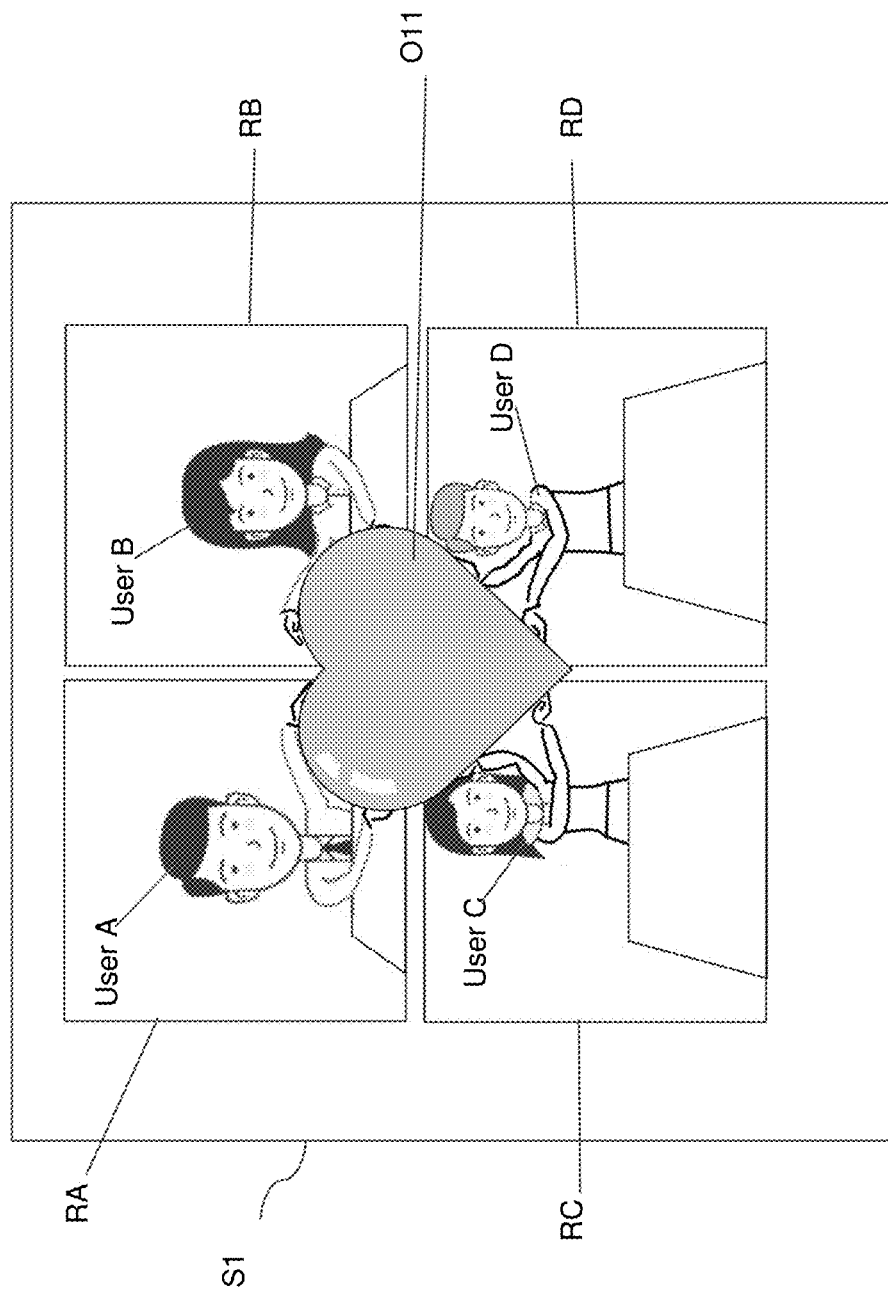

FIG. 11A, FIG. 11B and FIG. 11C show an exemplary interaction in a group call in accordance with some embodiments of the present disclosure.

Referring to FIG. 11A, a trajectory or an outline O1 is displayed on the screen S1. The outline O1 is displayed across the display regions RA, RB, RC and RD. Each display region shows a portion of the outline O1. In this embodiment, The display regions RA, RB, RC and RD are mutually separated from each other. In some embodiments, the display regions RA, RB, RC and RD may be partially overlapped. In this embodiment, the outline O1 is of a heart shape. In some embodiments, the outline can be of any shape such as a round shape, an oval shape or a square shape. The outline O1 may be referred to as a first pattern. The outline O1 may be obtained from a server or a user terminal.

Referring to FIG. 11B, users A, B, C and D try to align with the outline O1. The outline 01 is compared with portions of user A, user B, user C and user D. User A uses hands and arms (may be partially covered in clothes) to align with or to conform to the portion of the outline O1 displayed in the display region RA. User B uses hands and arms (may be partially covered in clothes) to align with or to conform to the portion of the outline O1 displayed in the display region RB. User C uses hands and arms (may be partially covered in clothes) to align with or to conform to the portion of the outline O1 displayed in the display region RC. User D uses hands and arms (may be partially covered in clothes) to align with or to conform to the portion of the outline O1 displayed in the display region RD.

Referring to FIG. 11C, a special effect O11 is displayed on the screen S1. The special effect O11 can serve as an update of a result of the comparison between the outline O1 and portions of user A, user B, user C and user D. The special effect O11 may be a graphical object, an animated object or an embodied object of the outline O1. In some embodiments, the special effect O11 is displayed when a collective shape or a collective pattern formed by or composed of the portions of users (such as body parts or non-body parts of users A, B, C and D) matches or conforms to the outline O1. The collective pattern is formed across display regions RA, RB, RC and RD.

In some embodiments, the collective pattern formed by the users may be recognized by a user terminal or a system that provides the service of the group call with a pattern recognition process. In some embodiments, the pattern recognition process may include a gesture recognizing process, a skin recognizing process, a contour recognizing process, a shape detection process or an object recognizing process. In some embodiments, the pattern recognition process may include an image comparison process (such as comparing a sequence of images with a default initial background image for each user's display region) or a moving object detection process. In some embodiments, a motion estimation (ME) technique or a motion compensation (MC) technique may be used. In some embodiments, the collective pattern may be referred to as a second pattern.

A determination of whether or not the collective pattern matches or conforms to the outline O1 (or, a comparison between the outline O1 and the portions of the users) may be done by an image or pattern comparison/ matching process, which may include calculating a similarity index (such as a correlation value) between the collective pattern and the outline O1. In some embodiments, the similarity index calculation may include a correlation calculation process, a trajectory overlapping process, a normalization process, or a minimum distance determination process. The image or pattern comparison process may be done by a user terminal or a system that provides the service of the group call. In some embodiments, the special effect O11 is displayed if the similarity index is equal to or greater than a predetermined value.

Figure 12A:
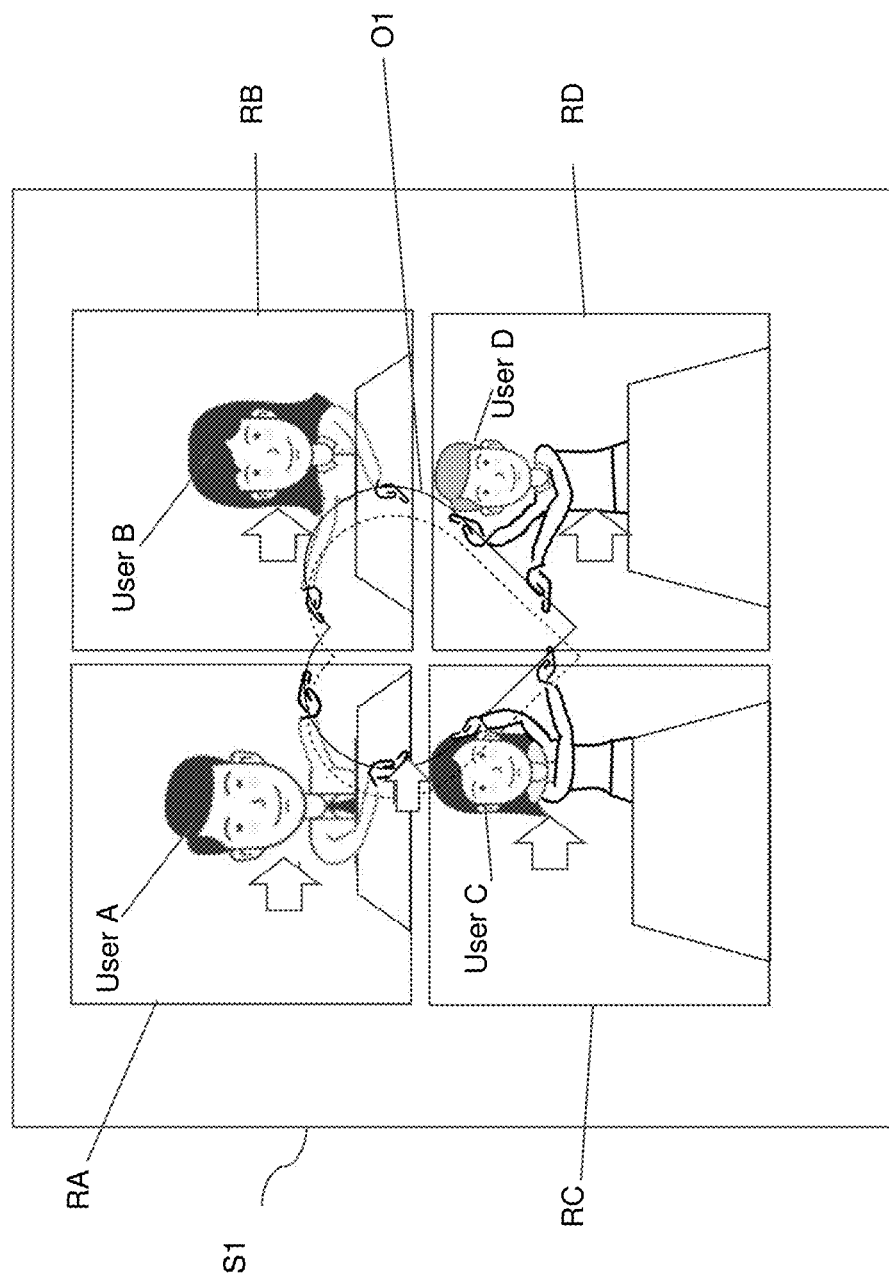
FIG. 12A and FIG. 12B show an exemplary interaction in a group call in accordance with some embodiments of the present disclosure.
Figure 12B:
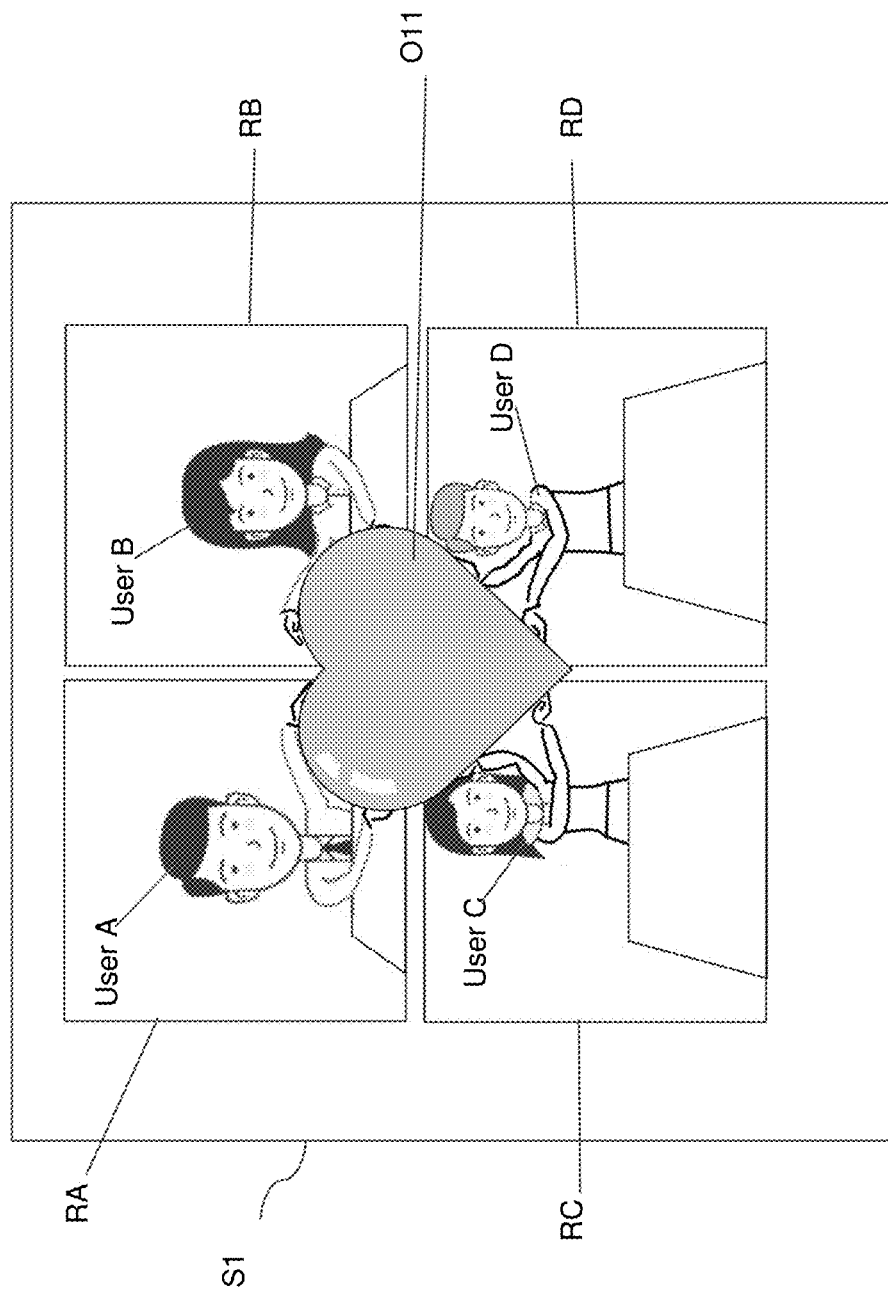

FIG. 12A and FIG. 12B show another exemplary interaction in a group call in accordance with some embodiments of the present disclosure.

Referring to FIG. 12A, the outline O1 keeps moving by an offset, and positions of the portions (such as hands) of the users are adjusted in realtime. In this embodiment, the outline O1 is moved in a lateral direction. In other embodiments, the outline O1 may be moved in a vertical direction, a diagonal direction or any direction. In some embodiments, the outline O1 may be moved in a back and forth manner. In some embodiments, the outline O1 may be moved periodically with a time period such as 1 second, 2 seconds or 3 seconds. In some embodiments, the outline O1 may be moved intermittently with a varying time period.

Referring to FIG. 12B, a special effect O11 is displayed on the screen S1. The special effect O11 may be a graphical object, an animated object or an embodied object of the outline O1. In some embodiments, the special effect O11 is displayed when a collective shape or a collective pattern formed by or composed of the portions of users (such as body parts or non-body parts of users A, B, C and D) matches or conforms to the outline O1. In this embodiment, the outline O1 is a moving outline or a moving object. Therefore, users A, B, C and D need to move their portions along with the movement of the outline O1 in order for their collective pattern to continually or periodically match or conform to the outline O1.

The collective pattern may be continually or periodically recognized by the user terminal or a system that provides the service of the group call with a pattern recognition process. A determination of whether or not the collective pattern matches or conforms to the outline O1 may be done by an image or pattern comparison process, which may include continually or periodically calculating a similarity index (such as a correlation value) between the moving collective pattern and the moving outline O1. The image or pattern comparison process may be done by a user terminal or a system that provides the service of the group call. In some embodiments, the special effect O11 is displayed if the similarity index is continually or periodically equal to or greater than a predetermined value. For example, the special effect O11 may be displayed if the similarity index is equal to or greater than a predetermined value for a predetermined time period (such as 5 seconds or 10 seconds) or for a predetermined number of cycles (such as 3 times or 5 times of movement of the outline O1).

Figure 13:
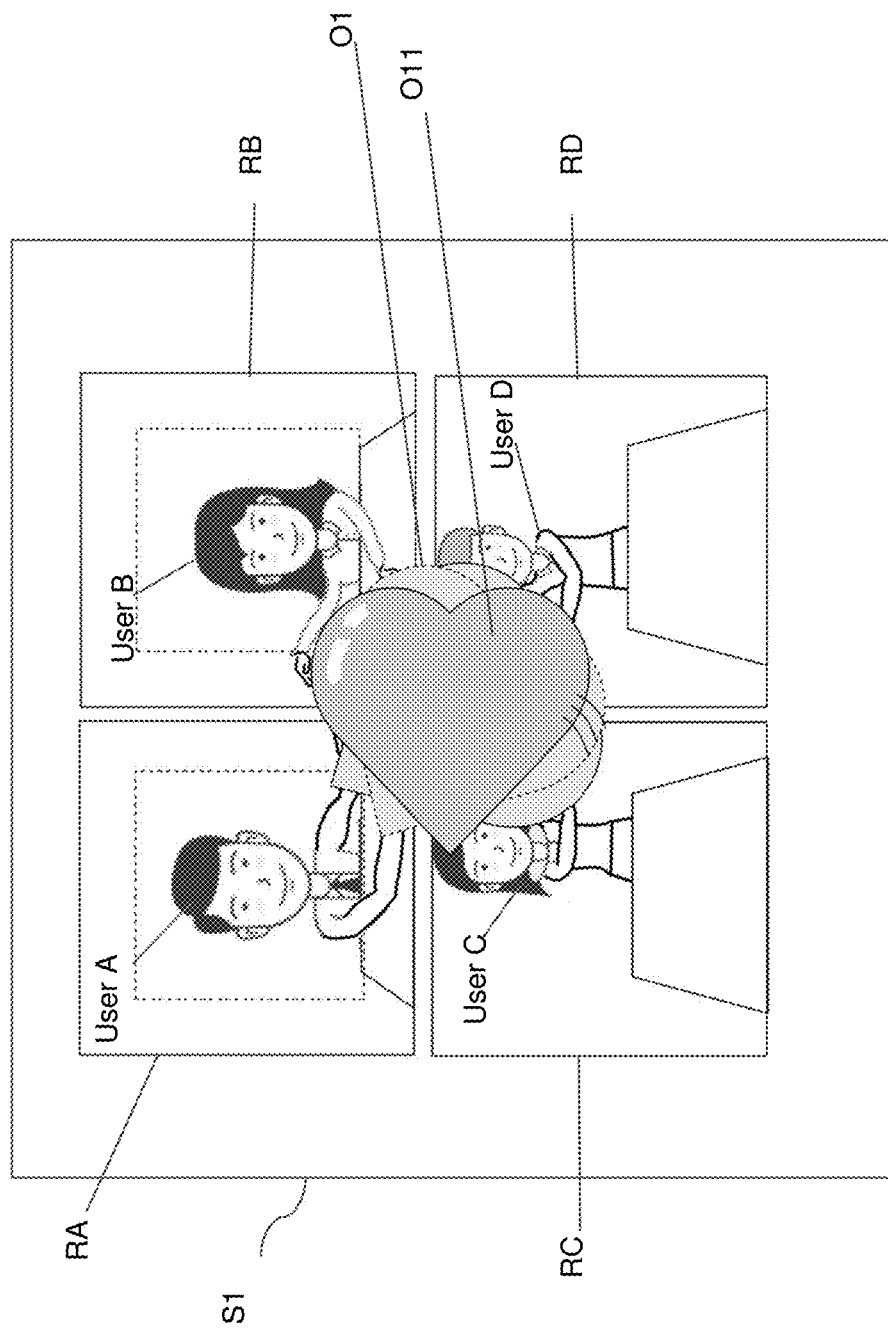
FIG. 13 shows an exemplary interaction in a group call in accordance with some embodiments of the present disclosure.

FIG. 13 shows another exemplary interaction in a group call in accordance with some embodiments of the present disclosure.

Referring to FIG. 13, the outline O1 is rotated continually, periodically or intermittently by an offset degree. In some embodiments, the outline O1 may be rotated in a back and forth manner. In some embodiments, the outline O1 may be rotated periodically with a time period such as 1 second, 2 seconds or 3 seconds. In some embodiments, the outline O1 may be rotated intermittently with a varying time period.

A special effect O11 is displayed on the screen S1. The special effect O11 may be a graphical object, an animated object or an embodied object of the outline O1. In some embodiments, the special effect O11 is displayed when a collective shape or a collective pattern formed by or composed of the portions of users (such as body parts or non-body parts of users A, B, C and D) matches or conforms to the outline O1. In this embodiment, the outline O1 is a moving outline or a moving object (herein "moving" includes "rotating"). Therefore, users A, B, C and D need to move their portions along with the movement (or the rotation) of the outline O1 in order for their collective pattern to continually or periodically match or conform to the outline O1.

The collective pattern may be continually or periodically recognized by the user terminal or a system that provides the service of the group call with a pattern recognition process. A determination of whether or not the collective pattern matches or conforms to the outline O1 may be done by an image or pattern comparison process, which may include continually or periodically calculating a similarity index (such as a correlation value) between the moving/ rotating collective pattern and the moving/ rotating outline O1. The image or pattern comparison process may be done by a user terminal or a system that provides the service of the group call. In some embodiments, the special effect O11 is displayed if the similarity index is continually or periodically equal to or greater than a predetermined value. For example, the special effect O11 may be displayed if the similarity index is equal to or greater than a predetermined value for a predetermined time period (such as 5 seconds or 10 seconds) or for a predetermined number of cycles (such as 3 times or 5 times of movement of the outline O1).

In some embodiments, the continual or periodical matching between the outline O1 and the collective pattern formed by users may be served as a method to test the synchronization status or synchronization level of the connection between the users during the group call. For example, when a user feels an unsmooth communication, he or she may initiate or start, through a user terminal, a round of the processes such as: displaying the outline O1, periodically moving the outline O1, periodically recognizing a collective pattern formed by the users, and periodically comparing the collective pattern and the outline O1. If a periodical matching (for example, matching for a predetermined time period or for a predetermined number of cycles) is achieved, then the synchronization level may be determined to be acceptable.

For example, if the similarity index between the outline O1 and the collective pattern is equal to or greater than a predetermined value for a predetermined time period, a message indicating an acceptable synchronization may be displayed on the user terminal. The message may be a special effect like O11 or in any other form. On the contrary, if the similarity index between the outline O1 and the collective pattern is found to be less than a predetermined value, a message indicating an unacceptable synchronization may be displayed on the user terminal. In that case, users can know the connection status is not in good condition and may communicate at a slower pace or may change to another communication way. In some embodiments, the above synchronization test may be done before starting an online game or any event that requires smooth connection between the users.

Figure 14:
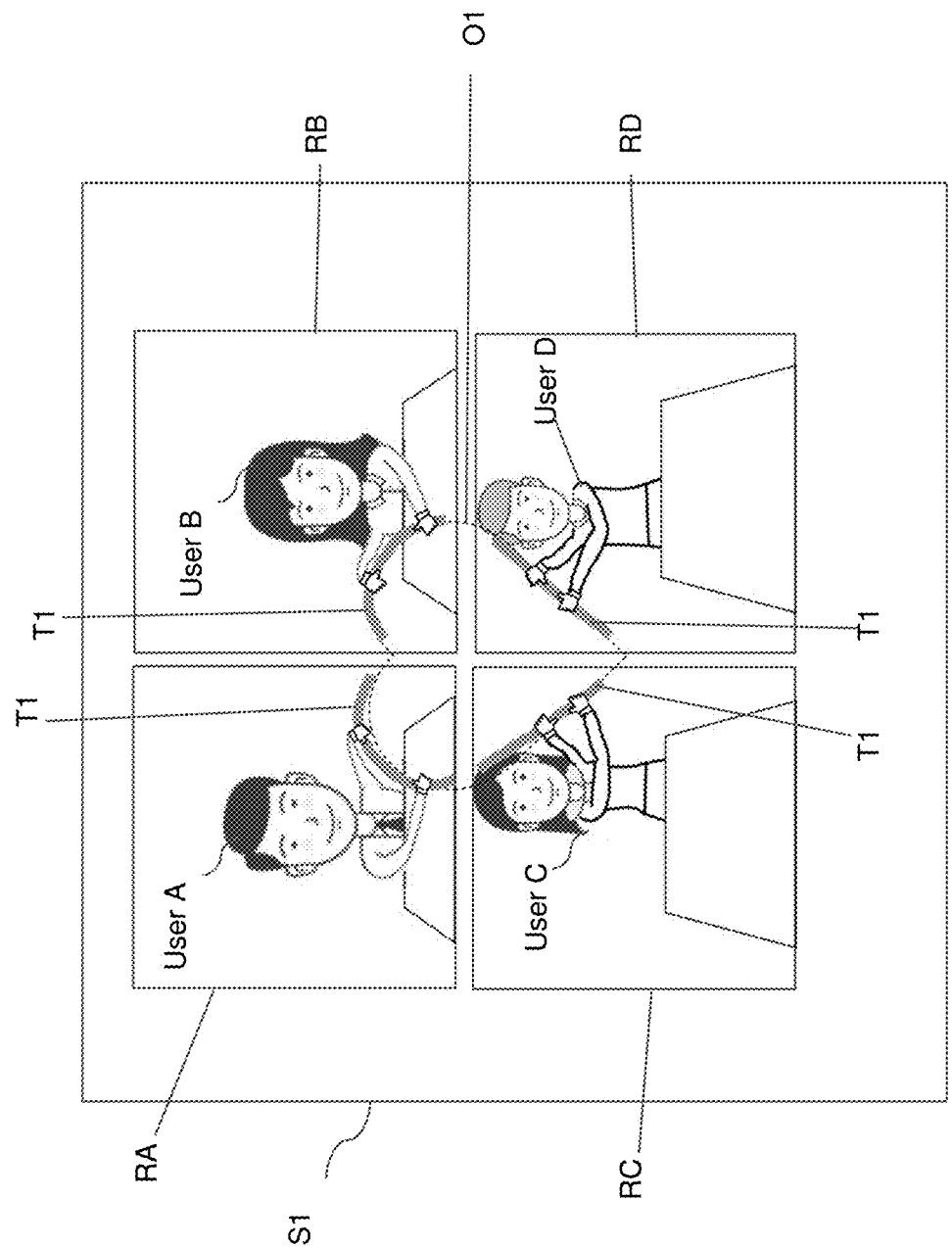
FIG. 14 shows an exemplary interaction in a group call in accordance with some embodiments of the present disclosure.

FIG. 14 shows another exemplary interaction in a group call in accordance with some embodiments of the present disclosure.

In this embodiment, users A, B, C and D use an object or a tool T1 to match or to conform to the outline O1. The tool T1 may include a flexible material and can be bended or deformed to conform to a particular shape. For example, user A could bend the tool Ti to conform to the portion of the outline O1 displayed in the display region RA. In some embodiments, information such as a color or a shape of the tool T1 may be taught to a user terminal or a system that provides the service of the group call. The user terminal or the system may use the information of the tool T1 to recognize the collective pattern formed by users A, B, C and D.

Figure 15:
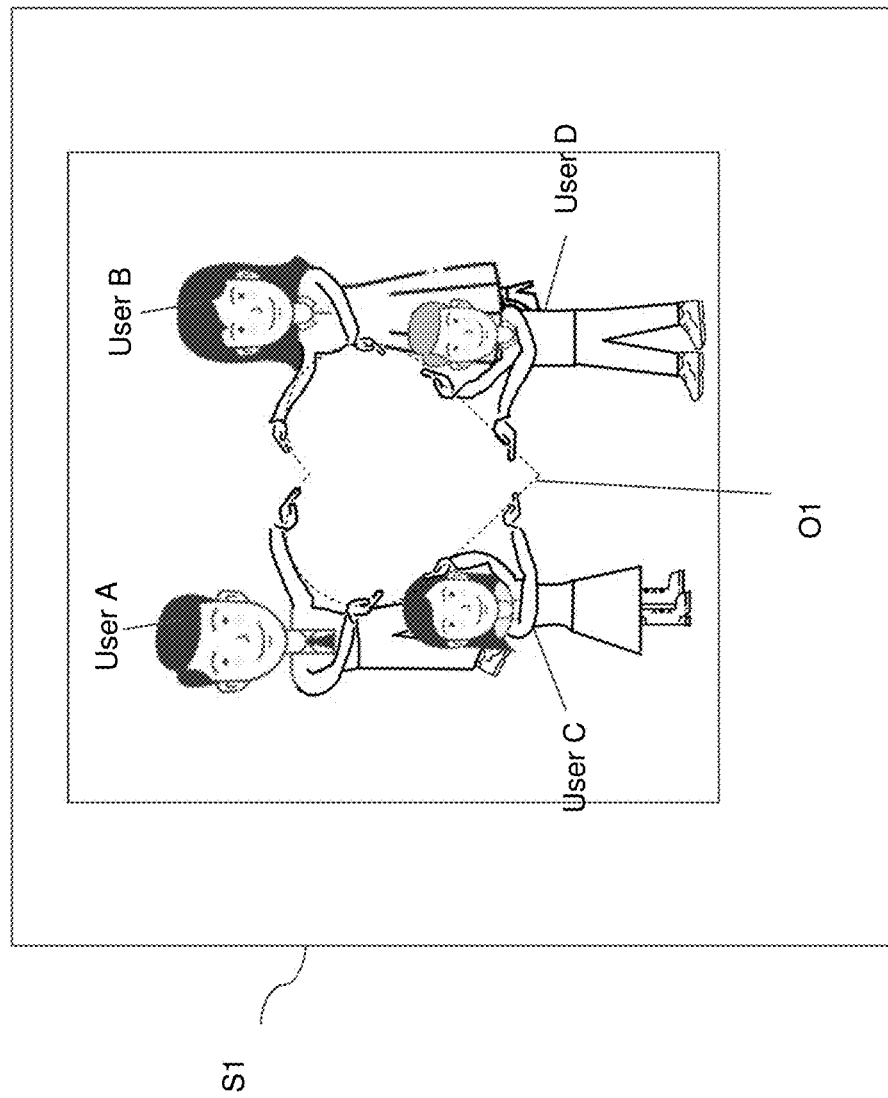
FIG. 15 shows an exemplary interaction in a live streaming in accordance with some embodiments of the present disclosure.

FIG. 15 shows another exemplary interaction in a live streaming (which may be in a group call or non-group call form) in accordance with some embodiments of the present disclosure.

In this embodiment, users A, B, C and D are displayed in a single display region on a screen S1 of a user terminal. Users A, B, C and D may actually be in the same space. Or, users A, B, C and D may be in different places and their respective images or videos are combined into one display region through image or video processing performed by a user terminal or a system participating in or providing the streaming service. Similar to the embodiments described previously, users A, B, C and D try to form a collective pattern to match to an outline O1. A special effect may occur if the matching is achieved.

In some embodiments, a special effect following a successful matching between a collective pattern (formed by portions of users) and a predetermined outline may be viewed as a reward. And the matching mechanism may be viewed as a method to boost the atmosphere or the interaction of a live streaming involving multiple users. For example, a successful matching may lead to, initiate or trigger a donation or a gift sending from the user who initiated the matching process. The user who initiates the matching process may be a streamer (or anchor, broadcastor) or a viewer (or a fan) of the streaming. Therefore, a more collective or interesting interaction between users involved in a streaming or live streaming is achieved. This may increase the gift sending and improve the revenue of the streaming service provider or the streamer, which may further lead to better platform performance or better content production. In some embodiments, a gift sending is triggered or realized according to the result of the comparison between the outline 01 and the portions of users.

Figure 16:
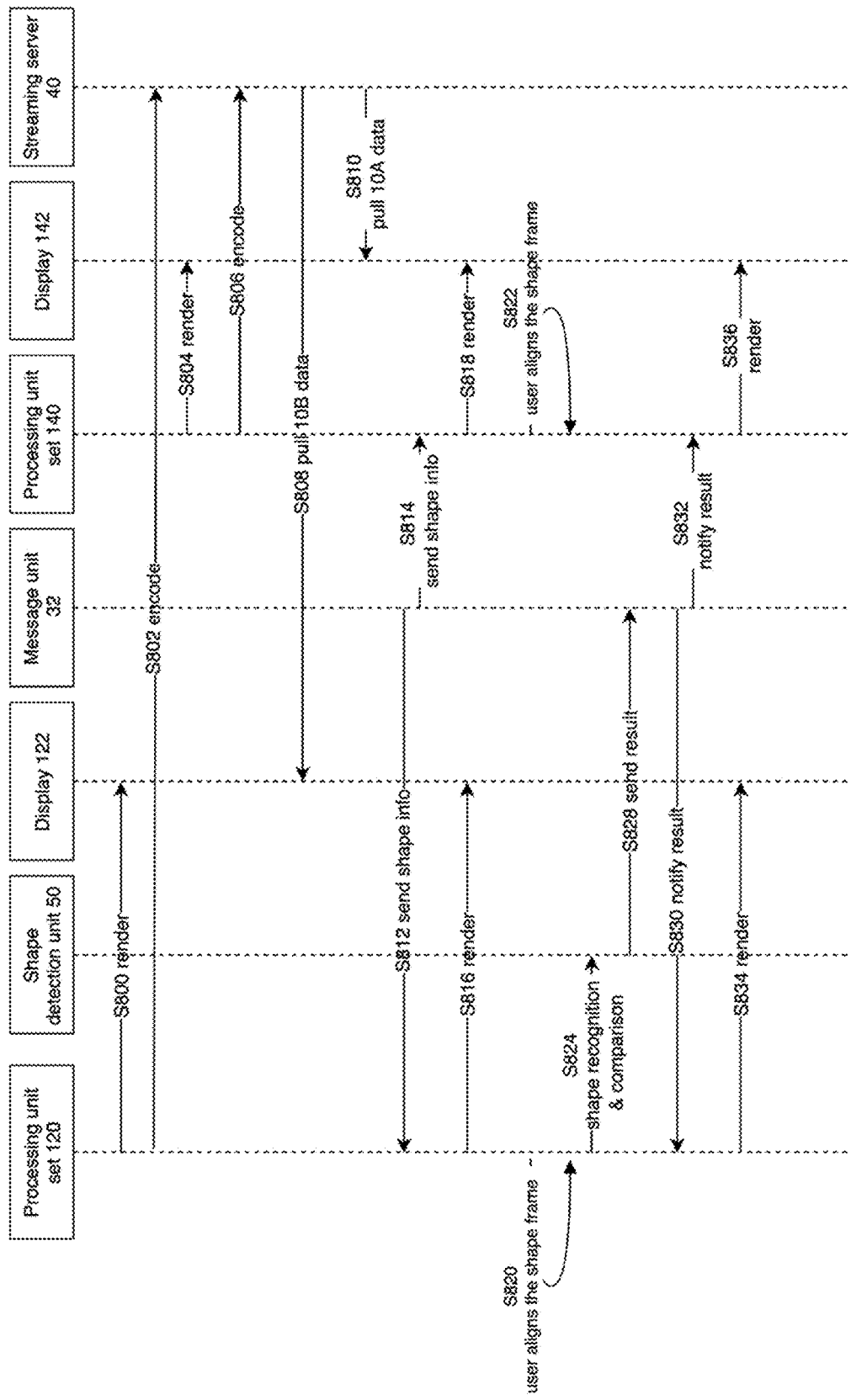
FIG. 16 shows an exemplary sequence chart illustrating an operation of a communication system in accordance with some embodiments of the present disclosure.

FIG. 16 shows an exemplary sequence chart illustrating an operation of a communication system in accordance with some embodiments of the present disclosure.

The processing unit set 120 may include components or devices in a user terminal 10A used by a user A. For example, processing unit set 120 may include a renderer, an encoder, a decoder, a CPU, a GPU, a controller, a processor and/or an image/video capturing device such as a camera. The user terminal 10A is an example of one of the user terminals 10 as shown in FIG. 7.

The display 122 may refer to the display of the user terminal 10A used by user A.

The processing unit set 140 may include components or devices in a user terminal 10B used by a user B. For example, processing unit set 140 may include a renderer, an encoder, a decoder, a CPU, a GPU, a controller, a processor and/or an image/video capturing device such as a camera. The user terminal 10B is an example of one of the user terminals 10 as shown in FIG. 7.

The display 142 may refer to the display of the user terminal used by user B.

The message unit 32 is configured to communicate messages or signals with devices such as a user terminal, a backend server 30 or a streaming server 40. In some embodiments, the message unit 32 may be implemented in a backend server 30. In some embodiments, the message unit 32 may be implemented independently from a backend server 30.

The shape detection unit 50 is configured to perform a shape/pattern detection/recognition process, which may include a gesture recognizing process, a skin recognizing process, a contour recognizing process, and/or an object recognizing process. The shape detection unit 50 may be configured to perform a pattern comparison process, which may include calculating a similarity index or a correlation value between two patterns. According to different embodiments, the shape detection unit 50 may be implemented in a user terminal, in a backend server 30, or may be implemented independently. In this embodiment, the pattern recognition process and the pattern comparison process are both done by the shape detection unit 50. In some embodiments, the two processes can be done by different units, each implemented in a user terminal, a backend server 30 or implemented independently, according to the actual practice.

In step S800, the processing unit set 120 renders video data to be shown on the display 122, which may include video of a user A captured by a video capturing device.

In step S802, the processing unit set 120 transmits an encoded video data to the streaming server 40. The encoded video data may include video of user A encoded by an encoder.

In step S804, the processing unit set 140 renders video data to be shown on the display 142, which may include video of a user B captured by a video capturing device.

In step S806, the processing unit set 140 transmits an encoded video data to the streaming server 40. The encoded video data may include video of user B encoded by an encoder.

In step S808, video data of user B is pulled from the streaming server 40 to be shown on the display 122. Note that some processes such as decoding, processing or rendering of the pulled video data are omitted here.

In step S810, video data of user A is pulled from the streaming server 40 to be shown on the display 142. Note that some processes such as decoding, processing or rendering of the pulled video data are omitted here.

In step S812, a shape or pattern information is transmitted from the message unit 32 to the processing unit set 120.

In step S814, a shape or pattern information is transmitted from the message unit 32 to the processing unit set 140. Step S812 and step S814 may occur concurrently.

In some embodiments, the transmitting of the shape information may be triggered by an operation of a user through a user terminal. The user may be a streamer, a broadcastor, an anchor, or a viewer. In some embodiments, the transmitting of the shape information may be triggered by a provider of the communication or the streaming service.

In step S816, the processing unit set 120 renders a shape or pattern corresponding to the received or obtained shape information to be shown on the display 122. Therefore, user A can see the pattern he or she needs to conform to (for example, a portion of the pattern in the display region of user A) on the screen.

In step S818, the processing unit set 140 renders a shape or pattern corresponding to the received or obtained shape information to be shown on the display 142. Therefore, user B can see the pattern he or she needs to conform to (for example, a portion of the pattern in the display region of user B) on the screen.

In step S820, user A tries to fill, match or conform to the shape. For example, user A tries to behave such that a portion of user A or a tool used by user A (displayed on the display 122) conforms to the portion of the shape displayed in the display region of user A.

In step S822, user B tries to fill, match or conform to the shape. For example, user B tries to behave such that a portion of user B or a tool used by user B (displayed on the display 142) conforms to the portion of the shape displayed in the display region of user B.

In step S824, the shape detection unit 50 detects or recognizes a collective shape or a collective pattern formed by user A and user B. The collective shape to be recognized may be displayed on the display 122. In this embodiment, the shape detection unit 50 compares the collective shape with the initial shape (or predetermined shape) displayed on the display 122 (for example, in step S816) corresponding to the shape information received in step S812. The shape detection unit 50 may calculate a similarity index or a correlation value between the collective shape and the predetermined shape, and determine if a matching is achieved or not with a predetermined threshold.

In step S828, the matching result is transmitted from the shape detection unit 50 to the message unit 32.

In step S830, the message unit 32 notifies the processing unit set 120 of the matching result.

In step S832, the message unit 32 notifies the processing unit set 140 of the matching result. Step S830 and step S832 may occur concurrently.

In step S834, a special effect is rendered on the display 122 if the matching is successful. The special effect may include a message indicating a smooth synchronization of the communication between user A and user B.

In step S836, a special effect is rendered on the display 142 if the matching is successful. The special effect may include a message indicating a smooth synchronization of the communication between user A and user B.

In some embodiments, the message unit 32 may periodically send shape information to each user terminal, each time with an offset included into the shape information. Therefore, a moving or rotating shape can be displayed on the display of each user terminal. The subsequent pattern recognition process and pattern matching process may also be periodically performed to serve as a synchronization level check for the communication. For example, a user can get a visual sense of how good the synchronization is from what he sees on the display.

With regard to the screen S1 of FIG. 10 (or FIG. 11A), it can be assumed that the screen S1 is implemented on a user terminal of any one of user A, user B, user C or user D. In some embodiment, the communication system may be configured to swap the display regions of any two of the users. The communication system may receive an instruction to swap from one of the user terminals. By doing so, the degree of freedom of arrangement increases and the interaction between users is further improved.

In some embodiments, the screen S1 of FIG. 10 (or FIG. 11A) may be implemented on a user terminal of a streamer. In this case, the streamer can tell the users A-D what to do, and thereby their interactions are enhanced. This will strengthen a sense of unity among the streamer and the users A-D. Any one of users A-D can be a streamer or a viewer.

In some embodiment, the trajectory or the outline O1 is chosen, by one of the users or by voting, from a list of candidate outlines, each of which is tied to its respective amount of gift or is tied to its respective gift with an amount of value. The amount (or amount of value) may be set so that the higher the amount, the more difficult it is to match the respective outline. In some embodiments, a value of the gift corresponds to a matching difficulty of the outline/ pattern. Alternatively, the outline O1 may arbitrarily be chosen from a list of candidate outlines, or the outline O1 may be determined based on the profiles of the attending users A-D.

Figure 17:
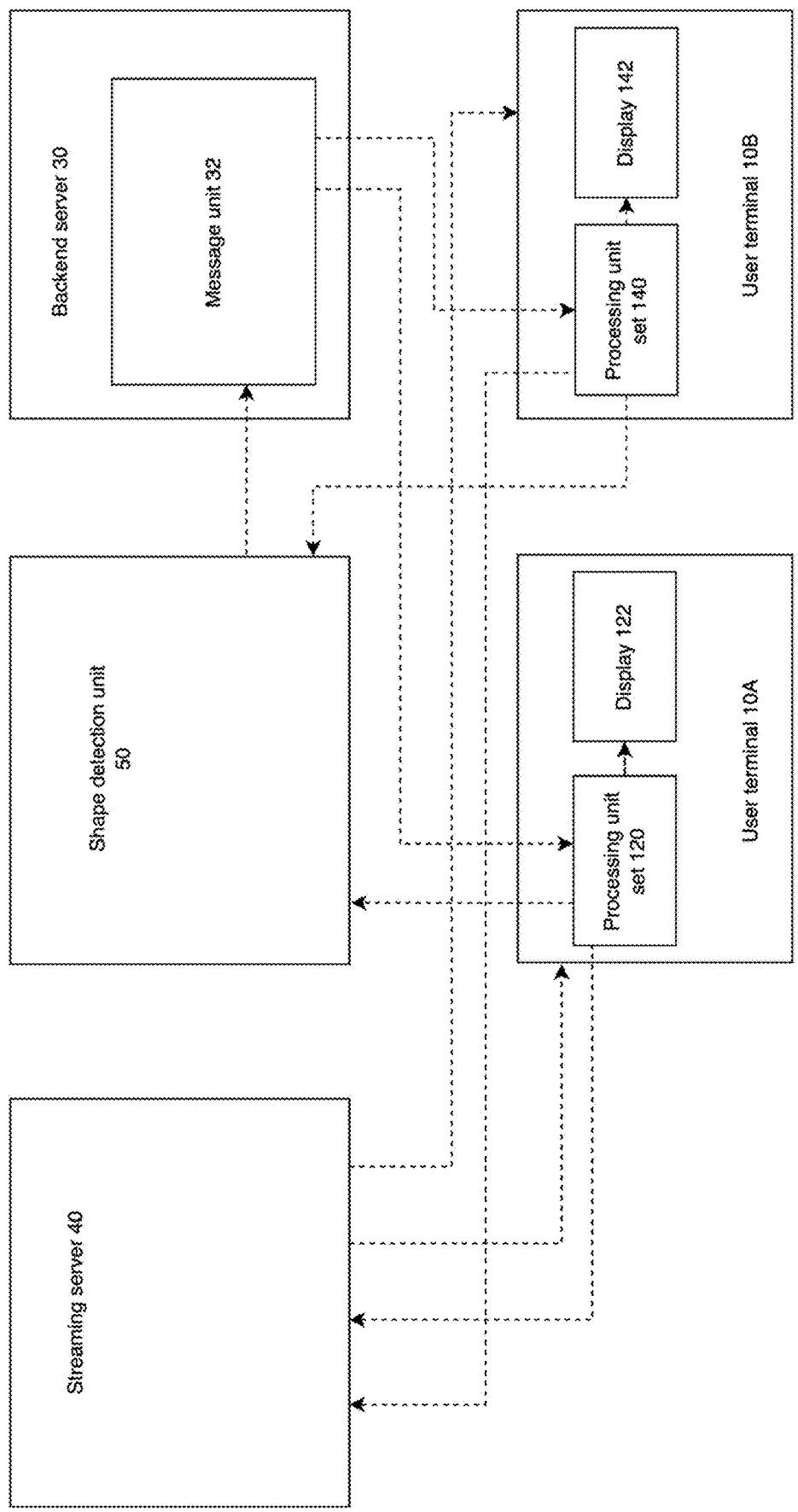
FIG. 17 shows an exemplary functional configuration of a communication system according to some embodiments of the present disclosure.

FIG. 17 shows an exemplary functional configuration of a communication system according to some embodiments of the present disclosure. In this embodiment, a shape detection unit 50 is implemented independently, instead of being within a backend server 30, a streaming server 40 or a user terminal. In another embodiment, the shape detection unit 50 may be implemented within a backend server, a streaming server, a cache server or a user terminal. In this embodiment, the message unit 32 is implemented within the backend server 30. In another embodiment, the message unit 32 may be implemented outside the backend server 30. For example, the message unit 32 may be implemented independently, or may be implemented within a streaming server, a cache server or a user terminal.

User terminal 10A is a user terminal used by a user A. The user terminal 10A includes a processing unit set 120 and a display 122. The processing unit set 120 may include a renderer, an encoder, a decoder, a CPU, a GPU, a controller, a processor and/ or an image/ video capturing device such as a camera.

User terminal 10B is a user terminal used by a user B. The user terminal 10B includes a processing unit set 140 and a display 142. The processing unit set 120 may include a renderer, an encoder, a decoder, a CPU, a GPU, a controller, a processor and/ or an image/ video capturing device such as a camera.

Referring to FIG. 16 and FIG. 17, the message unit 32 may transmit a shape or pattern information to the processing unit set 120 of the user terminal 10A and the processing unit set 140 of the user terminal 10B. The above pattern information transmission may be triggered by a user terminal (such as a user terminal of a streamer or a viewer), a server in the system, or an application that supports the communication, wherein The processing unit set 120 renders a shape or pattern corresponding to the received or obtained shape information to be shown on the display 122. Therefore, user A can see the pattern he or she needs to conform to (for example, a portion of the pattern in the display region of user A) on the screen.

The processing unit set 140 renders a shape or pattern corresponding to the received or obtained shape information to be shown on the display 142. Therefore, user B can see the pattern he or she needs to conform to (for example, a portion of the pattern in the display region of user B) on the screen.

The processing unit set 120 and the processing unit set 140 then collect the video/ image data of user A and user B trying to conform to their respective portions of the pattern, and transmit the data to the shape detection unit 50.

The shape detection unit 50 detects or recognizes a collective shape or a collective pattern formed by user A and user B. In this embodiment, the shape detection unit 50 compares the collective shape with the initial shape (or predetermined shape) displayed on the display 122 (for example, in step S816 of FIG. 16) corresponding to the shape information received in step S812 of FIG. 16. The shape detection unit 50 may calculate a similarity index or a correlation value between the collective shape and the predetermined shape, and determine if a matching is achieved or not with a predetermined threshold. The shape detection unit 50 then transmits the matching result to the message unit 32.

The message unit 32 notifies the processing unit set 120 and the processing unit set 140 of the matching result. A special effect may be rendered by the processing unit set 120 and the processing unit set 140 to be displayed on the display 122 and the display 142 if the matching is successful. The special effect may include a message indicating a smooth synchronization of the communication between user A and user B.

The present disclosure improves interaction during a conference call or a group call, facilitates synchronization of online communication, and improves revenue for a provider of an online communication service.

Conventionally, compared with face-to-face communication, on-line communication has some disadvantages which may reduce the communication efficiency or increase the chances of misunderstanding. For example, during a live video or a live streaming communication, it is difficult to keep the focus on the correct region, especially when there are some distractions such as comments, special effects on the display wherein the live video is being displayed. For another example, during a live video or a live streaming communication, it is difficult to see the details of the video content due to the limited size of the display or the limited resolution of the video.

Figure 18:
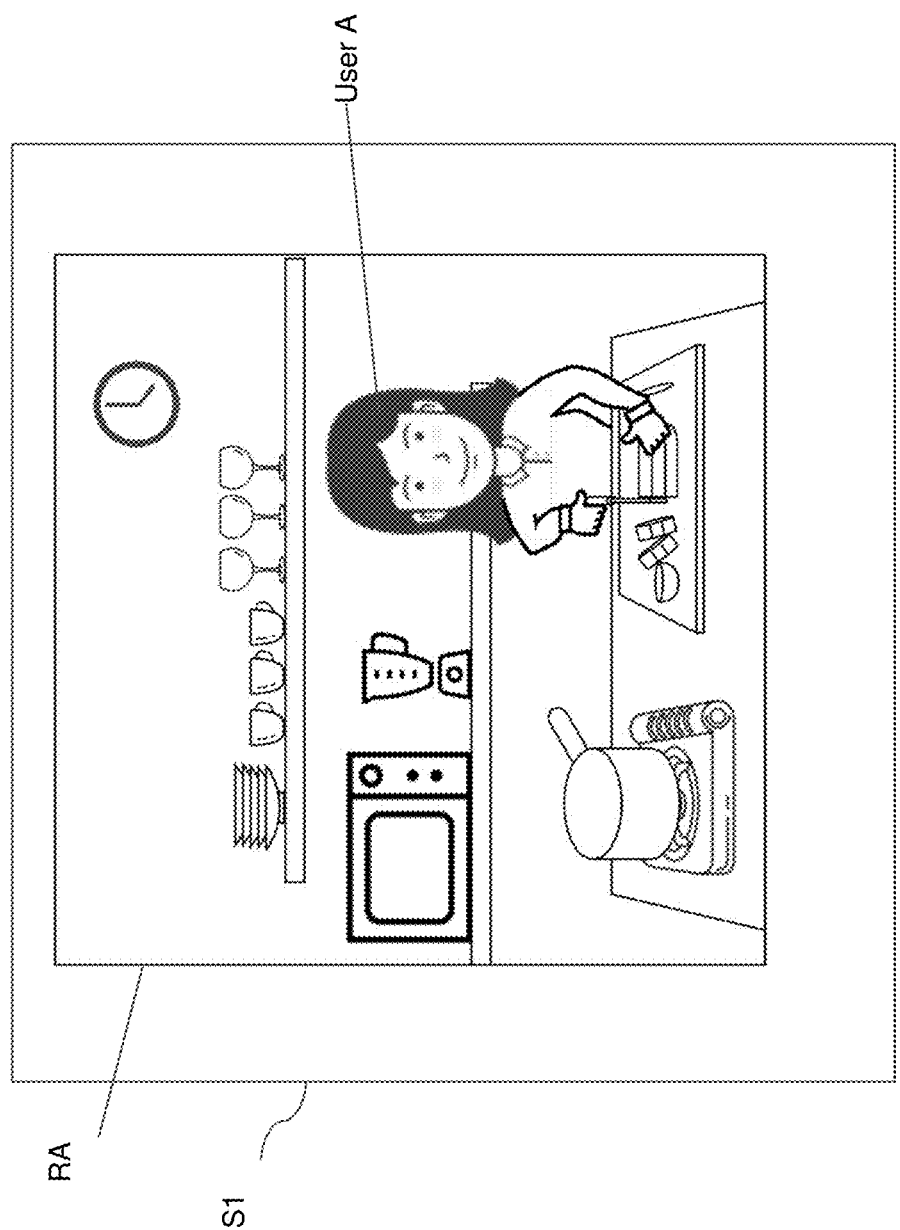
FIG. 18 shows an example of a live streaming.

FIG. 18 shows an example of a live streaming. S1 is a screen of a user terminal displaying the live streaming. RA is a display region within the screen S1 displaying a live video of a user A. The live video of user A may be taken and provided by a video capturing device, such as a camera, positioned in the vicinity of user A. In this example, user A may be a streamer or a broadcastor who is distributing a live video to teach how to cook.

User A would like viewers of this live video to be able to focus on the right region of the video, and to be able to see the details of the region, in order for the viewers to get the correct knowledge such as cooking steps or cooking materials. Conventionally, user A may need to bring up the object of interest (such as a pan or a chopping board) closer to the camera for the users to see clearly. Or, user A may need to adjust a direction, a position or a focus of the camera for users to see the details user A wants to emphasize. The above actions are inconvenient for user A and interrupt the cooking process.

Therefore, it is desirable to have a method by which a user can indicate the region of interest in the live video and present the details of the region without having to stop the ongoing process. It is also desirable to have a method to help a viewer to focus on the correct region of a live video and to see the details of the region. The present disclosure can facilitate the presenting and focusing of a live video.

FIG. 19A, FIG. 19B, FIG. 19C, and FIG. 19D show exemplary streamings in accordance with some embodiments of the present disclosure.

Figure 19A:
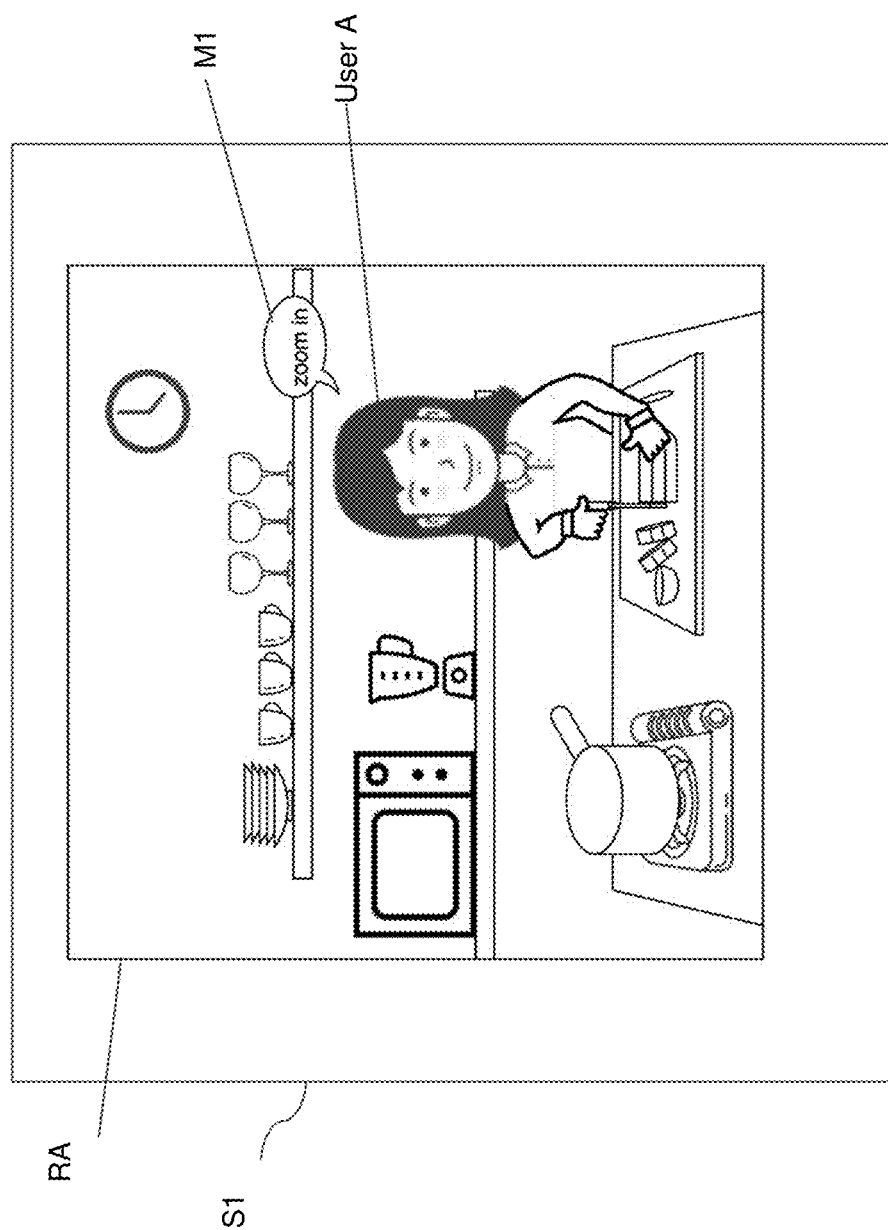
FIG. 19A, FIG. 19B, FIG. 19C, and FIG. 19D show exemplary streamings in accordance with some embodiments of the present disclosure.

Referring to FIG. 19A, user A sends out a message or a signal M1. In this embodiment, the message M1 is a voice message indicating "zoom in." In other embodiments, the message M1 may be a gesture message expressed by user A. For example, user A may use a body portion (such as a hand) to form a gesture message. In some embodiments, the message M1 may be a facial expression message expressed by user A. The message M1 is part of the video (including audio data) of user A.

The message M1 may be received by a user terminal used to capture the video of user A, such as a smartphone, a tablet, a laptop or any device with a video capturing function. In some embodiments, the message M1 is recognized by a user terminal used to produce or deliver the video of user A. In some embodiments, the message M1 is recognized by a system that provides the streaming service. In some embodiments, the message M1 is recognized by a server that supports the streaming service. In some embodiments, the message M1 is recognized by an application that supports the streaming service. In some embodiments, the message M1 is recognized by a voice recognition process, a gesture recognition process and/or a facial expression recognition process. In some embodiments, the message M1 may be an electrical signal, and can be transmitted and received by wireless connections.

Figure 19B:
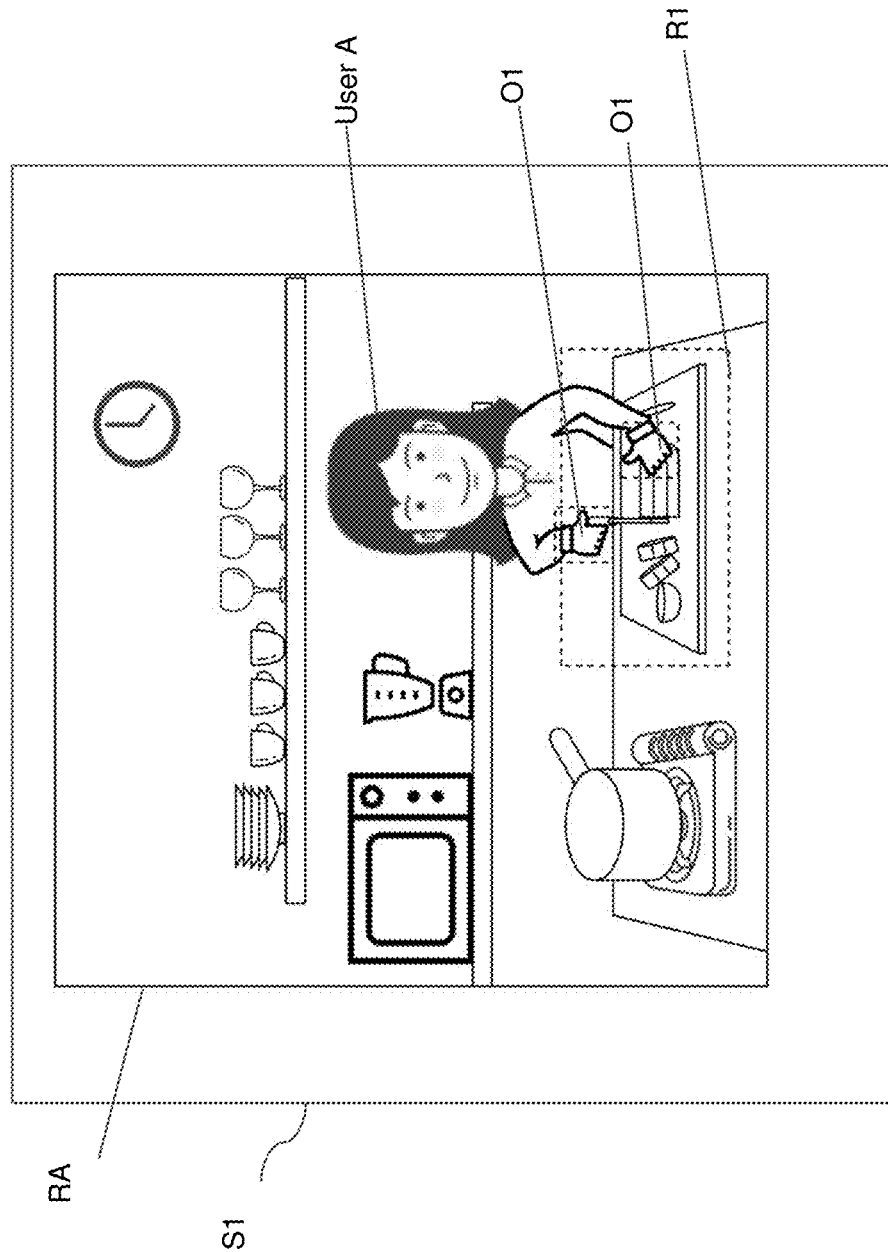

Referring to FIG. 19B, objects O1 are recognized, and a region R1 is determined. The objects O1 are recognized according to the message M1. In some embodiments, the recognition of the object O1 follows the receiving of the message M1. In some embodiments, the receiving of the message M1 triggers the recognition of the object O1. In some embodiments, a recognition of the message M1 is done before the recognition of the object O1.

In this embodiment, the object O1 is set, taught or determined to be a body part (hands) of user A. In other embodiments, the object O1 may be determined to be a non-body object such as a chopping board or a pan. In some embodiments, the object O1 may be determined to be a wearable object on user A such as a watch, a bracelet or a sticker. The object O1 may be predetermined or set to be any object in the video of user A.

The region R1 is determined to be a region in the vicinity of the object O1. For example, the region R1 may be determined to be a region enclosing or surrounding all objects O1, thereby user A may control the size of the region R1 conveniently by controlling the positions of objects O1 (in this case, the objects O1 are her hands). A distance between an edge of the region R1 and the object O1 may be determined according to the actual practice.

In some embodiments, different messages M1 may correspond to different predetermined objects O1. For example, user A may choose the object to be recognized, and the region to be determined, simply by sending out the corresponding message. For example, user A may speak "pan," and then a pan (which is a predetermined object corresponding to the message "pan") is recognized, and the region R1 would be determined to be a region in the vicinity of the pan.

In some embodiments, an object O1 is recognized by a user terminal used to capture the live video of user A. In some embodiments, an object O1 is recognized by a user terminal used to produce or deliver the video of user A. In some embodiments, an object O1 is recognized by a system that provides the streaming service. In some embodiments, an object O1 is recognized by a server that supports the streaming service. In some embodiments, an object O1 is recognized by an application that supports the streaming service.

In some embodiments, the region R1 is determined by a user terminal used to capture the live video of user A. In some embodiments, the region R1 is determined by a user terminal used to produce or deliver the video of user A. In some embodiments, the region R1 is determined by a system that provides the streaming service. In some embodiments, the region R1 is determined by a server that supports the streaming service. In some embodiments, the region R1 is determined by an application that supports the streaming service.

Figure 19C:
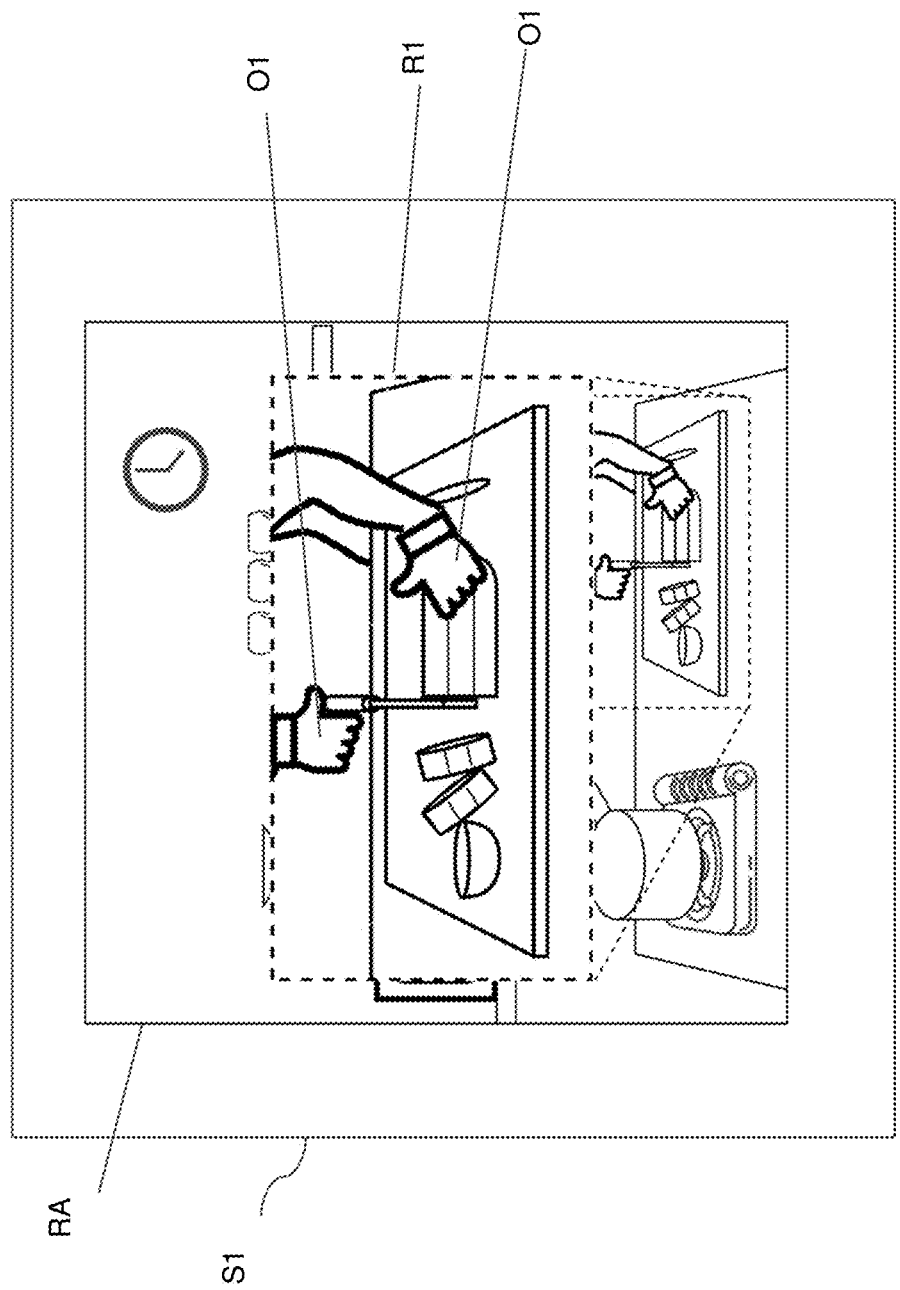

Referring to FIG. 19C, the region R1 is enlarged such that details of the video content within the region R1 can be seen clearly. The enlarged region R1 may cover or overlap a portion of the video of user A that is outside the region R1. The enlarged region R1 may be displayed on any region of the screen S1.

In some embodiments, the enlarging process is performed by a user terminal used to capture the live video of user A. In some embodiments, the enlarging process is performed by a user terminal used to produce or deliver the video of user A. In some embodiments, the enlarging process is performed by a system that provides the streaming service. In some embodiments, the enlarging process is performed by a server that supports the streaming service. In some embodiments, the enlarging process is performed by an application that supports the streaming service. In some embodiments, the enlarging process is performed by a user terminal displaying the video of user A, such as a user terminal of a viewer.

In an embodiment wherein the enlarging process is performed by a user terminal that captures the video of user A, the user terminal can be configured to capture the region R1 (the region R1 may move according to a movement of an object O1) with a higher resolution compared to another region outside of the region R1. Therefore, the region of the live video to be enlarged has a higher resolution than another region of the live video not to be enlarged. Therefore, the region to be emphasized can have more information for a viewer to see the details.

Figure 19D:
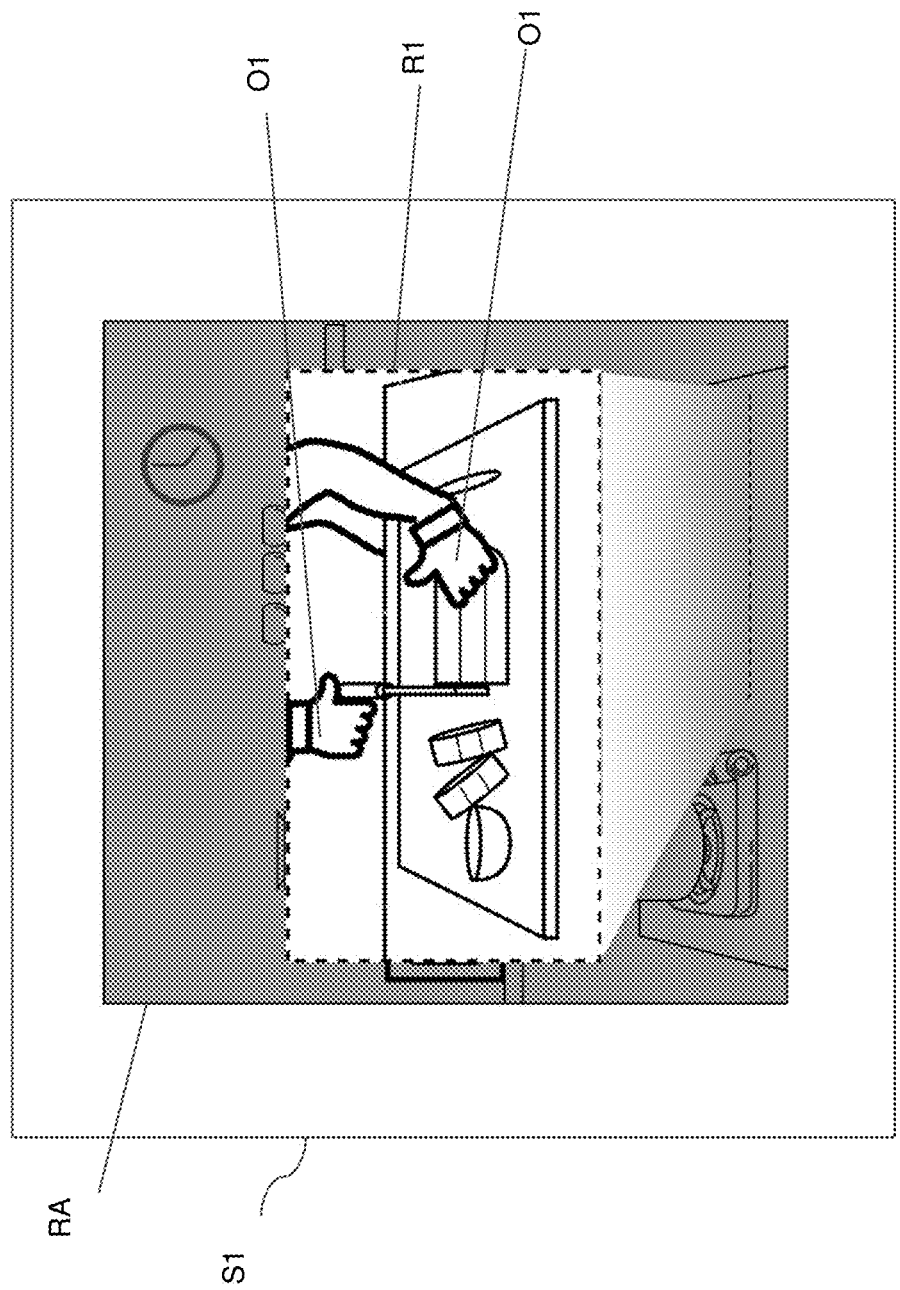

Referring to FIG. 19D, in some embodiments, except for the enlarged region R1, other regions within the display region RA may be processed such that the enlarged region R1 stands out and becomes more obvious. For example, other regions may be darkened or blurred, such that a viewer can focus more easily on the region R1.

FIG. 20 shows an exemplary streaming in accordance with some embodiments of the present disclosure.

Referring to FIG. 20, the object O1 is determined to be a wearable device or a wearable object on user A. The object O1 moves synchronously with a movement of user A, and the region of the live video to be enlarged moves synchronously with a movement of the object O1. Therefore, it is convenient for user A to determine which region to be enlarged or emphasized by simply controlling the position of the object O1. In some embodiments, enlarging a region of a live video and/ or moving the enlarged region are done with video processes executed by a user terminal, a server, or an application. Therefore, a direction of a video capturing device used to capture the live video can be kept fixed when the region of the live video to be enlarged moves synchronously with the movement of the predetermined object.

In some embodiments, a user may send out a first message to trigger a message recognition process, and then send out a second message to indicate which object to recognize. The object then determines the region to be enlarged. The first message and/or the second message can be or can include voice message, gesture message or facial expression message. In some embodiments, the first message can be referred to as a trigger message.

For example, user A may speak "focus" or "zoom in" to indicate that whatever he or she sends out next is for recognizing the object O1. Next, user A may speak "pan" such that a pan on the video would be recognized as the object O1. Subsequently, a region in the vicinity of the pan would be enlarged.

In some embodiments, the above configuration may save the resources used in message recognition. For example, a constantly ongoing message recognition process (which may include comparing the video information with a message table) can be only focused on the first message, which may be a single voice message. The second message may have more variants, each corresponding to a different object in the video. The message recognition process for the second message can be turned on only when the first message is received and/ or detected.

Figure 21:
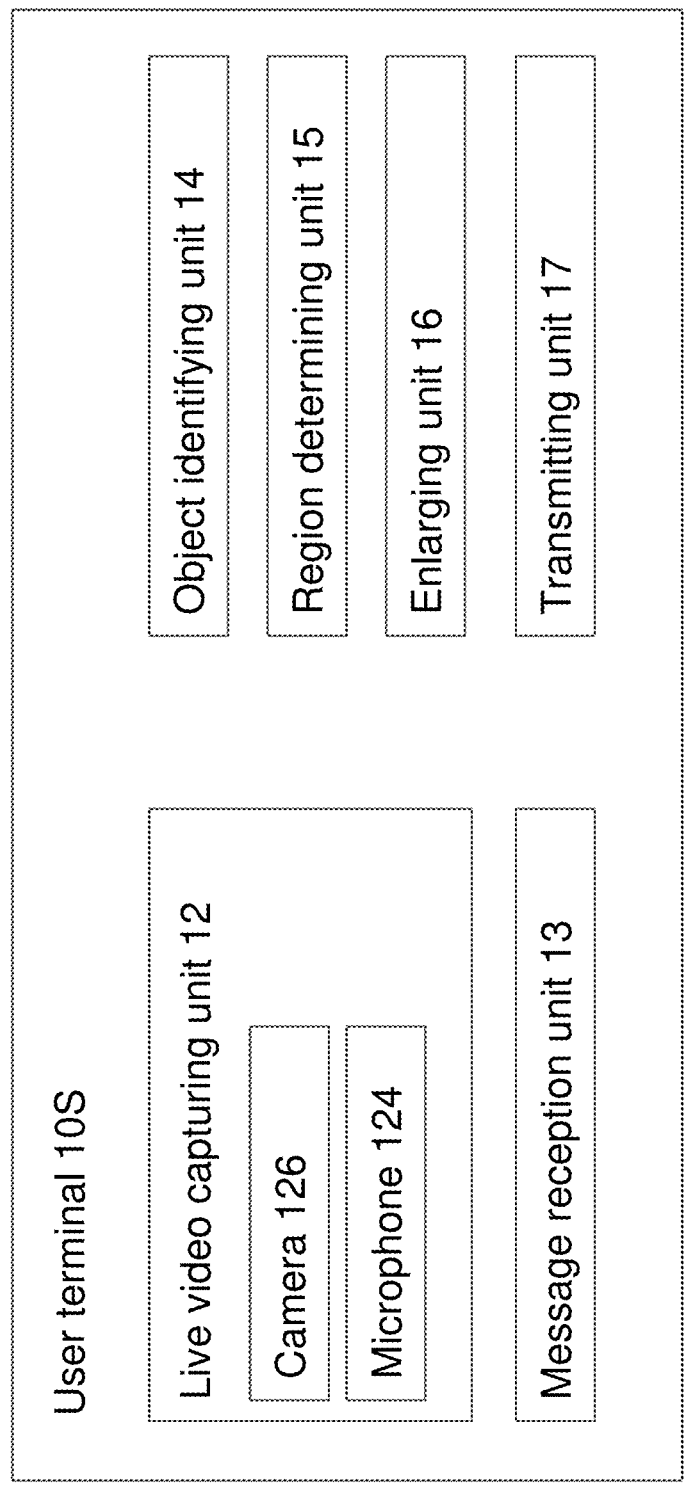
FIG. 21 shows a block diagram of a user terminal according to some embodiments of the present disclosure.

FIG. 21 shows a block diagram of a user terminal according to some embodiments of the present disclosure.

The user terminal 10S is a user terminal of a streamer or a broadcastor. The user terminal 10S includes a live video capturing unit 12, a message reception unit 13, an object identifying unit 14, a region determining unit 15, an enlarging unit 16, and a transmitting unit 17. The user terminal 10S is an example of one of the user terminals 10 as shown in FIG. 7.

The live video capturing unit 12 includes a camera 126 and a microphone 124, and is configured to capture live video data (including audio data) of the streamer.

The message reception unit 13 is configured to monitor voice stream (or image stream in some embodiments) in the live video, and to recognize a predetermined word (for example, "focus" or "zoom-in") in the voice stream.

The object identifying unit 14 is configured to identify one or more predetermined objects in the live video, and to recognize the identified one or more objects in the image or the live video. The identification of objects may be done by a look-up table and the predetermined word recognized by the message reception unit 13, which will be described later. In another embodiment, the identification of objects may be done by the message reception unit 13.

The region determining unit 15 is configured to determine a region in the live video to be enlarged. The region to be enlarged is a region in the vicinity of the identified or recognized object.

The enlarging unit 16 is configured to perform video processes related to enlarging a region of a live video. In an embodiment wherein the region to be enlarged is captured with a higher resolution, the camera 126 may be involved in the enlarging process.

The transmitting unit 17 is configured to transmit the enlarged live video (or a live video with a region enlarged) to a server (such as a streaming server) if the enlarging process is performed. If an enlarging process is not performed, the transmitting unit 17 transmits the live video captured by the live video capturing unit 12.

FIG. 22 shows an exemplary look-up table in accordance with some embodiments of the present disclosure, which may be utilized by the object identifying unit 14 of FIG. 21.

The column "predetermined word" indicates the words to be identified in the voice stream of the live video. The column "object" indicates the object corresponding to each predetermined word to be recognized. For example, in this example, an identified "zoom-in" leads to recognition of the streamer's hand in the live video, an identified "pan" leads to recognition of a pan in the live video, an identified "board please" leads to recognition of a chopping board in the live video.

In some embodiments, the predetermined words or the objects are pre-set by a user. In some embodiments, the predetermined words or the objects may be auto-created through AI or machine learning.

The processing and procedures described in the present disclosure may be realized by software, hardware, or any combination of these in addition to what was explicitly described. For example, the processing and procedures described in the specification may be realized by implementing a logic corresponding to the processing and procedures in a medium such as an integrated circuit, a volatile memory, a non-volatile memory, a non-transitory computer-readable medium and a magnetic disk. Further, the processing and procedures described in the specification can be implemented as a computer program corresponding to the processing and procedures, and can be executed by various kinds of computers.

The system or method described in the above embodiments may be integrated into programs stored in a computer-readable non-transitory medium such as a solid state memory device, an optical disk storage device, or a magnetic disk storage device. Alternatively, the programs may be downloaded from a server via the Internet and be executed by processors.

Although technical content and features of the present invention are described above, a person having common knowledge in the technical field of the present invention may still make many variations and modifications without disobeying the teaching and disclosure of the present invention. Therefore, the scope of the present invention is not limited to the embodiments that are already disclosed, but includes another variation and modification that do not disobey the present invention, and is the scope covered by the patent application scope.

DESCRIPTION OF REFERENCE NUMERALS

S1 Screen
RA Region
RB Region
RC Region
RD Region
A1 Portion
A11 Portion

A2 Portion
A21 Portion
A3 Boundary
A31 Interactive region
A311 Subregion
A312 Subregion
A313 Subregion
A32 Region
B1 Object
B3 Boundary
B31 Interactive region
B32 Region
BR1 Border
BR2 Border
SP1 Special effect
1 System
10 User terminal
10A User terminal
10B User terminal
10S User terminal
30 Backend server
32 Message unit
40 Streaming server
400 Data receiver
402 Data transmitter
90 Network
700 Camera
702 Renderer
704 Display
706 Encoder
708 Decoder
710 Result sender
712 Matting unit
714 Object recognizing unit
800 Camera
802 Renderer
804 Display
806 Encoder
808 Decoder
810 Result receiver
812 Image processor
O1 Object
O11 Special effect
T1 Tool
120 Processing unit set
122 Display
140 Processing unit set
142 Display
50 Shape detection unit
S800, S802, S804, S806, S808, S810, S812, S814, S816, S818, S820, S822,
S824, S828, S830, S832, S834, S836 Step
12 Live video capturing unit
124 Microphone
126 Camera
13 Message reception unit
14 Object identifying unit
15 Region determining unit
16 Enlarging unit
17 Transmitting unit The present techniques will be better understood with reference to the following enumerated embodiments:

A1. A method for video processing, comprising: displaying a live video of a first user in a first region on a user terminal; and displaying a video of a second user in a second region on the user terminal; wherein a portion of the live video of the first user extends to the second region on the user terminal.

A2. The method according to A1, further comprising: defining an interactive region in the first region; detecting a portion of the first user in the interactive region; and displaying the portion of the first user in the second region.

A3. The method according to A2, wherein the detecting the portion of the first user in the interactive region includes a matting process.

A4. The method according to A2, wherein the detecting the portion of the first user in the interactive region includes an object recognizing process.

A5. The method according to A4, further comprising: displaying a special effect on the user terminal if the object recognizing process recognizes a predetermined pattern in the portion of the first user.

A6. The method according to A4, wherein the object recognizing process includes a gesture recognizing process or a skin recognizing process.

A7. The method according to A2, wherein the detecting the portion of the first user in the interactive region includes an image comparison process or a moving object detection process.

A8. The method according to A1, wherein the first user and the second user are aligned in a lateral direction on the user terminal, and the portion of the live video of the first user extends towards the second user in the first region.

A9. The method according to A1, wherein the first user and the second user are aligned in a vertical direction on the user terminal, and the portion of the live video of the first user extends towards the second user in the first region.

A10. The method according to A1, wherein the first user and the second user are aligned in a diagonal direction on the user terminal, and the portion of the live video of the first user extends towards the second user in the first region.

A11. The method according to A2, further comprising: determining a position of the portion of the first user in the interactive region; and determining a position of the second region based on the position of the portion of the first user in the interactive region.

A12. The method according to A1, further comprising: determining the portion of the live video of the first user by detecting a portion of the first user crossing a border in the first region on the user terminal.

A13. The method according to A12, wherein a position of the border is determined by the first user.

A14. The method according to A12, wherein the border corresponds to a direction of the second region with respect to the first region and is between the first region and the second region.

A15. The method according to A1, wherein the video of the second user is a live video.

A16. The method according to A1, wherein the portion of the live video of the first user extending to the second region is represented as a graphical object.

A17. The method according to A1, further comprising: displaying a special effect in the second region if the portion of the live video of the first user extends to the second region and touches the second user.

A18. A system for video processing, comprising one or a plurality of processors, wherein the one or plurality of processors execute a machine-readable instruction to perform: displaying a live video of a first user in a first region on a user terminal; and displaying a video of a second user in a second region on the user terminal; wherein a portion of the live video of the first user extends to the second region on the user terminal.

A19. The system according to A18, wherein the one or plurality of processors execute the machine-readable instruction to further perform: defining an interactive region in the first region; detecting a portion of the first user in the interactive region; and displaying the portion of the first user in the second region.

A20. A non-transitory computer-readable medium including a program for video processing, wherein the program causes one or a plurality of computers to execute: displaying a live video of a first user in a first region on a user terminal; and displaying a video of a second user in a second region on the user terminal; wherein a portion of the live video of the first user extends to the second region on the user terminal.

B1. method for image recognition, comprising: obtaining a first pattern to be displayed on a user terminal; comparing the first pattern with portions of users displayed on the user terminal; and updating a result of the comparison.

B2. The method according to B1, wherein positions of the portions of the users are adjusted in real time.

B3. The method according to B1, wherein the comparing the first pattern with the portions of the users comprises calculating a similarity index between the first pattern and a second pattern composed of the portions of users.

B4. The method according to B3, further comprising: displaying a special effect if the similarity index is equal to or greater than a predetermined value.

B5. The method according to B3, further comprising: periodically obtaining the first pattern to be displayed on the user terminal; and periodically calculating the similarity index between the first pattern and the second pattern, wherein the periodically obtained first pattern moves on the user terminal.

B6. The method according to B5, further comprising: displaying a message indicating an acceptable synchronization on the user terminal if the periodically calculated similarity index is equal to or greater than a predetermined value for a predetermined time period.

B7. The method according to B3, further comprising recognizing the second pattern with a gesture recognizing process, a skin recognizing process, a contour recognizing process, a shape detection process, an object recognizing process, an image comparison process, or a moving object detection process.

B8. The method according to B1, wherein the portions of the users comprise body parts or non-body parts of the users.

B9. The method according to B3, wherein the calculating the similarity index between the first pattern and the second pattern comprises a correlation calculation process, a trajectory overlapping process, a normalization process, or a minimum distance determination process.

B10. The method according to B1, wherein the users are displayed in respective display regions on the user terminal, and the respective display regions are separated from each other.

B11. The method according to B10, further comprising swapping the display regions of any two of the users.

B12. The method according to B1, wherein the users are displayed in a single display region on the user terminal B13. The method according to B1, wherein the first pattern crosses at least two mutually separated display regions displaying the users.

B14. The method according to B1, further comprising realizing a gift sending according to the result of the comparison.

B15. The method according to B14, wherein a value of the gift corresponds to a matching difficulty of the first pattern.

B16. A system for image recognition, comprising one or a plurality of processors, wherein the one or plurality of processors execute a machine-readable instruction to perform: obtaining a first pattern to be displayed on a user terminal; comparing the first pattern with portions of users displayed on the user terminal; and updating a result of the comparison.

B17. A non-transitory computer-readable medium including a program for image recognition, wherein the program causes one or a plurality of computers to execute: obtaining a first pattern to be displayed on a user terminal; comparing the first pattern with portions of users displayed on the user terminal; and updating a result of the comparison.

C1. A method for live video processing, comprising: receiving a message from a user while live video created by the user is being broadcasted; and enlarging a region of the live video in the vicinity of a predetermined object according to the message.

C2. The method according to C1, further comprising recognizing the predetermined object in the live video according to the message.

C3. The method according to C2, further comprising receiving a trigger message from the user, wherein the trigger message triggers the recognizing the predetermined object in the live video according to the message.

C4. The method according to C1, wherein the message comprises a voice message, a gesture message, or a facial expression message.

C5. The method according to C1, further comprising recognizing the message from the user.

C6. The method according to C5, wherein the recognizing the message from the user comprises a voice recognition process, a gesture recognition process, or a facial expression recognition process.

C7. The method according to C1, wherein the predetermined object comprises a body part of the user or a wearable object on the user.

C8. The method according to C1, wherein the predetermined object moves synchronously with a movement of the user.

C9. The method according to C1, wherein the message corresponds to the predetermined object.

C10. The method according to C1, wherein the region of the live video to be enlarged is captured by a video capturing device with a higher resolution than another region of the live video not to be enlarged.

C11. The method according to C1, wherein the region of the live video to be enlarged moves synchronously with a movement of the predetermined object.

C12. The method according to C11, wherein the live video is generated by a video capturing device in the vicinity of the user, and a direction of the video capturing device are kept fixed when the region of the live video to be enlarged moves synchronously with the movement of the predetermined object.

C13. A system for live video processing, comprising one or a plurality of processors, wherein the one or plurality of processors execute a machine-readable instruction to perform: receiving a message from a user while live video created by the user is being broadcasted; and enlarging a region of the live video in the vicinity of a predetermined object according to the message.

C14. A non-transitory computer-readable medium including a program for live video processing, wherein the program causes one or a plurality of computers to execute: receiving a message from a user while live video created by the user is being broadcasted; and enlarging a region of the live video in the vicinity of a predetermined object according to the message.

What is claimed is:

1. A method for video processing related to live streaming in a mode where at least a first user and a second user simultaneously provide a first live video and a second live video, respectively, for the live streaming, the method performed by a user terminal of a third user viewing the live streaming, the method comprising:
   displaying the first live video of the first user in a first region of a display on the user terminal, the first live video representing real image of the first user;
   displaying, simultaneously with the display of the first video, the second live video of the second user in a second region of the display on the user terminal, the second region being apart from and lined up with the first region, the second live video representing real image of the second user;
   generating a first visual virtual effect in the second region, the first visual virtual effect being associated with the first live video; and
   generating a second visual virtual effect in the second region, the second visual virtual effect being generated subsequent to the first visual virtual effect, wherein the first and second visual virtual effects are displayed synchronously in the second region, and the first and second visual virtual effects are different,
   wherein the second visual virtual effect is displayed in such a manner to overlap with the real image of the second user in an area where the first visual virtual effect touches the real image of the second user in the second region, and the first visual virtual effect, the second visual virtual effect, and the real image of the second user overlap with each other, and
   wherein the second visual virtual effect is displayed only in the second region.

2. The method according to claim 1, wherein the generating the first visual virtual effect includes generating the first visual virtual effect so that the first visual virtual effect moves synchronously with the first live video.

3. The method according to claim 1, wherein the second visual virtual effect is an animated object representing hitting.

4. A method for video processing related to live streaming in a mode where at least a first user and a second user simultaneously provide a first live video and a second live video, respectively, for the live streaming, the method performed by an application program able to be installed on a user terminal of a third user viewing the live streaming, the method comprising:
   displaying the first live video of the first user in a first region of a display on the user terminal, the first live video representing real image of the first user;
   displaying, simultaneously with the display of the first video, the second live video of the second user in a second region of the display on the user terminal, the second region being apart from and lined up with the first region, the second live video representing real image of the second user;
   generating a first visual virtual effect in the second region, the first visual virtual effect being associated with the first live video; and
   generating a second visual virtual effect in the second region, the second visual virtual effect being generated subsequent to the first visual virtual effect, wherein the first and second visual virtual effects are displayed synchronously in the second region, and the first and second visual virtual effects are different,
   wherein the second visual virtual effect is displayed in such a manner to overlap with the real image of the second user in an area where the first visual virtual effect touches the real image of the second user in the second region, and the first visual virtual effect, the second visual virtual effect, and the real image of the second user overlap with each other, and
   wherein the second visual virtual effect is displayed only in the second region.

5. A non-transitory computer-readable medium including a program for video processing related to live streaming in a mode where at least a first user and a second user simultaneously provide a first live video and a second live video, respectively, for the live streaming, wherein the program causes one or a plurality of computers of a user terminal of a third user viewing the live streaming to execute:
   displaying the first live video of the first user in a first region of a display on the user terminal, the first live video representing real image of the first user;
   displaying, simultaneously with the display of the first video, the second live video of the second user in a second region of the display on the user terminal, the second region being apart from and lined up with the first region, the second live video representing real image of the second user;
   generating a first visual virtual effect in the second region, the first visual virtual effect being associated with the first live video; and
   generating a second visual virtual effect in the second region, the second visual virtual effect being generated subsequent to the first visual virtual effect, wherein the first and second visual virtual effects are displayed synchronously in the second region, and the first and second visual virtual effects are different,
   wherein the second visual virtual effect is displayed in such a manner to overlap with the real image of the second user in an area where the first visual virtual effect touches the real image of the second user in the second region, and the first visual virtual effect, the second visual virtual effect, and the real image of the second user overlap with each other, and
   wherein the second visual virtual effect is displayed only in the second region.

6. The method according to claim 1, wherein a movement of the first visual virtual effect is controlled by a movement of the first user, and wherein the movement of the first visual virtual effect is synchronous with the movement of the first user.

7. The method according to claim 1, wherein a first visual representation of the first visual virtual effect is shown in the first region, a second visual representation of the first visual virtual effect is shown in the second region, wherein the second visual representation is shown in the second region while the first visual representation is shown in the first region, and wherein the first visual representation shown in the first region is identical to the second visual representation shown in the second region.

8. The method according to claim 7, wherein the second visual virtual effect is displayed in the second region in response to the second visual representation of the first visual virtual effect coming into contact with the real image of the second user in the second region.

9. The method according to claim 1, wherein the first visual virtual effect represents a part of the first user.

10. The method according to claim 1, wherein the first visual virtual effect is extended from the first region to the second region.

11. The method according to claim 1, wherein the first visual virtual effect or the second visual virtual effect is tied to an amount of gift or gift with an amount of value.

* * * * *